United States Patent [19]

Tabei et al.

[11] Patent Number: 4,933,926
[45] Date of Patent: Jun. 12, 1990

[54] IMAGE FORMING MEDIUM, METHOD AND APPARATUS

[75] Inventors: Masatoshi Tabei; Yuzo Mizobuchi, both of Kanagawa, Japan

[73] Assignee: Fuji Photo Film Co., Ltd., Kanagawa, Japan

[21] Appl. No.: 155,172

[22] Filed: Feb. 11, 1988

[30] Foreign Application Priority Data

| Feb. 13, 1987 | [JP] | Japan | 62-029829 |
| Feb. 13, 1987 | [JP] | Japan | 62-029830 |
| Feb. 13, 1987 | [JP] | Japan | 62-029831 |
| Feb. 13, 1987 | [JP] | Japan | 62-029832 |
| Feb. 17, 1987 | [JP] | Japan | 62-032494 |

[51] Int. Cl.$^5$ .......... G11B 7/24; G11B 9/08; G11B 13/00
[52] U.S. Cl. .......... 369/100; 358/342; 369/126; 369/275.2; 365/112
[58] Field of Search .......... 369/14, 100, 275, 126; 358/335, 342; 365/106, 108, 109, 110, 112, 114; 250/327.2

[56] References Cited

U.S. PATENT DOCUMENTS

| 3,932,025 | 1/1976 | Lakatos et al. | 365/112 |
| 4,163,667 | 8/1979 | Wysocki | 365/112 |
| 4,170,475 | 10/1979 | Kuehnle et al. | 365/112 |
| 4,701,880 | 10/1987 | Ichihara | 365/110 |
| 4,778,985 | 10/1988 | Modisette et al. | 365/112 |
| 4,833,324 | 5/1989 | Kamientecki et al. | 250/327.2 |

FOREIGN PATENT DOCUMENTS

| 55-153140 | 11/1980 | Japan |
| 57-74847 | 5/1982 | Japan |
| 57-74848 | 5/1982 | Japan |

OTHER PUBLICATIONS

IEEE Transactions on Electron Devices, vol. ED-28, No. 7, Jul. 1981—"Rotating MNOS Disk Memory Device", Iwamura, et al.
The Institute of Electronics and Communication Engineers of Japan, National Convention Record, 1986—Mar. 23-26/86.

Primary Examiner—Donald McElheny, Jr.
Attorney, Agent, or Firm—Sughrue, Mion, Zinn, Macpeak & Seas

[57] ABSTRACT

The invention provides an image forming medium and method, and a recording and playback apparatus in which signals can be recorded on the medium sequentially, similar to a magnetic tape or the like, or simultaneously two dimensionally, similar to a photographic film. The recording medium includes a laminate formed on the surface of a semiconductor substrate having a conductive layer on the undersurface thereof. The laminate is formed of an oxide film, a nitrided film, a photoconductive semiconductor layer and a transparent conductive layer. For recording, an optical image is directed onto the transparent conductive layer while applying a predetermined potential between the transparent conductive layer and the conductive layer.

21 Claims, 17 Drawing Sheets

IMAGE FORMING MEDIUM, METHOD AND APPARATUS

BACKGROUND OF THE INVENTION

The present invention relates to a recording/playback device in a camera system employing electrophotography and a recording medium for use in such a system.

Referring to the accompanying drawings, a description will first be given of a recording medium composed of conventional semiconductor elements together with a recording/playback device therefore. In FIG. 1, there is shown a discoid recording medium 1 having a surface covered with a laminated recording material for the purpose of recording/playback. The recording medium 1 is turned by a driving gear 2 in a predetermined direction Y at a constant speed, whereas a stylus 3 is moved in the radial direction X of the recording medium 1 at a constant speed to scan the surface of the recording medium 1; i.e., the recording medium 1 is linearly spirally or concentrically scanned as the stylus 3 moves in the radial direction X.

The stylus 3 is connected via a coil 4 to an input/output circuit 5 and, when an input signal is recorded, the signal is supplied via the coil 4 to the stylus 3 while scanning is effected. When the signal is read out (played back), on the other hand, the stylus 3 is used to detect changes of electrostatic capacity as scanning is conducted, and the signal thus detected is supplied via the coil 4 to the input/output circuit 5.

Referring to FIG. 2, the structure of the recording medium 1 and the principle of recording/playback will subsequently be described. FIG. 2 is a sectional view of the recording medium taken on a line Z—Z in FIG. 1. As shown in FIG. 2, a silicon dioxide film ($SiO_2$) layer 7 and a nitride film ($Si_3N_4$) 8 are laminated on the surface of a semiconductor substrate 6 of n-type monocrystalline silicon, whereas a conductive layer 9 is formed by aluminum evaporation on the undersurface thereof.

At the time of recording/playback, the conductive layer 9 is set at ground potential and the stylus 3 is moved to scan the surface of the nitride film 8. When an input signal is recorded, a voltage corresponding to the voltage level of the input signal is applied via the stylus 3 to the nitride film 8 and, as resulting charges 10a are produced in the nitride film 8, a depletion layer 10b whose depth corresponds to the quantity of charge simultaneously appears within the semiconductor substrate 9. Since the charges are accumulated and held in the nitride film 8 even though the recording medium 1 is removed from the system, the recorded data can be maintained therein over a long period of time. At the time of playback, the portion (track) on which the data has been recorded is scanned by the stylus 3 to detect changes of electrostatic capacity according to the presence or absence or the depth of depletion layer 10b so that the recorded signal is played back by means of the signal thus detected.

In the aforementioned prior art, however, the stylus and the nitrided film of the recording medium must be spaced as close as several tens of angstroms to effect recording/playback. When scanning is conducted with such a minute space therebetween, the stylus and the recording medium in practice unavoidably sometimes make contact with each other, causing wear of both members.

Moreover, since such a conventional arrangement is designed to record electric signals using the stylus on a track basis, i.e., to record/play back the electric signal which changes with time, it is therefore impossible to implement recording/playback in the same manner as in conventional photography wherein optical images are directly simultaneously two-dimensionally photographed using silver salt films. Although a solid-state pickup device such as a CCD has recently been developed to make it relatively easy to record optical images two-dimensionally, there still exists difficulty in simplifying the device in construction because the conversion data into time series signals is relied upon to effect recording/playback.

SUMMARY OF THE INVENTION

The present invention is intended to eliminate the aforesaid shortcoming, and it is therefore an object of the invention to provide a novel optical recording/playback system capable of wide application in that digital and analog signals can be recorded/played back sequentially in time and also optical images of photographic objects can also be recorded two-dimensionally.

A novel recording medium embodying the present invention is composed of at least a laminate comprising a semiconductor layer, an insulating layer, a nitrided film layer and a photoconductive semiconductor layer in order that records may be stored over long periods of time without being volatilized by causing signal charges proportional to a change or resistance in the portion of the photoconductive semiconductor layer on which light has been incident to be produced in the nitrided film layer and also by causing a depletion layer corresponding to the signal charges to be produced in the semiconductor layer.

In a recording/playback system employed the aforesaid recording medium, recording/playback can be implemented without touching the recording medium but by letting light in particular act as in input or output medium. Accordingly, this system is applicable to recording/playback in various forms.

An important aspect of the present invention lies in the fact that there is provided at least a laminate comprising a transparent conductive layer having translucent conducting properties, a photoconductive semiconductor layer whose resistant value changes in proportion to the quantity of light received, a plurality of semiconductor layers mutually electrically separated from each other, an oxide film, a nitrided film and a conductive layer having conducting properties, wherein an input optical signal to be recorded is made incident and a predetermined voltage is applied between the transparent conductive layer and the conductive layer, and a depletion layer formed in the semiconductor layers and charges accumulated in the nitrided film are used to effect recording.

It is preferred to increase the mechanical strength of the semiconductor recording medium by attaching a glass or plastic transparent board to the surface of the transparent conductive layer on which the input optical signal is incident to make the input optical signal being recorded incident via the transparent board.

For the purpose of the present invention, the recording medium has a laminate formed on the surface of a semiconductor substrate and a conductive layer on the undersurface thereof, the laminate comprising an oxide film, a nitrided film, a photosensitive semiconductor and a transparent conductive layer.

A recording method newly developed this recording medium comprises applying an optical signal modulated according to an input signal or applying an image of a photographic object onto the transparent conductive layer while applying a predetermined voltage between the transparent conductive layer and the conductive layer of the recording medium, or applying the input signal between the transparent conductive layer and the conductive layer while irradiating the transparent conductive layer with a fixed intensity of illumination. A playback method newly developed the inventive medium comprises playing back a recorded signal by detecting the electrostatic capacity between the transparent conductive layer and the conductive layer while irradiating the transparent conductive layer of the recording medium with a fixed intensity of illumination.

Further in accordance with the present invention, an electronic still camera is provided employing a semiconductor recording medium composed of at least a laminate comprising a monocrystalline semiconductor layer, an oxide film and a nitride film and of a photoconductive semiconductor layer covering the undersurface of the monocrystalline semiconductor layer or the surface of the nitrided film, the camera further comprising at least a recording mechanism having means for applying a predetermined voltage between the photoconductive semiconductor layer and the monocrystalline semiconductor layer, and an optical system for applying an image of a photographic object to the photoconductive semiconductor layer; and a playback mechanism having means for linearly scanning the photoconductive semiconductor layer while applying a point light beam thereto with a fixed intensity of illumination, detecting means such as a stylus for detecting changes of electrostatic capacity resulting from the scanning, and playback means for forming an image signal such as a standard television signal according to the signal thus detected by the detecting means.

More particularly, the invention provides an electronic still camera system for recording images by accumulating the charges released from the monocrystalline semiconductor layer in the nitrided film as optical images of an object being photographed and which are incident on the photoconductive semiconductor layer and, at the time of playback, the images are play back by detecting the electrostatic capacity of each depletion layer produced in the monocrystalline semiconductor layer in proportion to the charges. Accordingly, photography of high quality can be realized with extremely simple mechanisms.

For the purpose of the present invention, the rays of light from a photographic object are focused to form an optical image on the recording medium composed of at least a laminate on the surface of a semiconductor substrate and of a conductive layer on the undersurface thereof, the laminate comprising an oxide film a nitrided film, a photoconductive semiconductor layer and a transparent electrode layer, a predetermined voltage being applied to the conductive layer, whereby a change of conductivity of photoconductive semiconductor layer resulting from the light of the optical image completely conforms to the optical pattern, of the image. Consequently, a potential pattern is applied between the nitrided film and the conductive layer and charges corresponding to the voltage are accumulated between the nitrided film and the oxide film, whereas a depletion layer corresponding to the charges thus accumulated is simultaneously formed in the semiconductor substrate, so that a latent image, formed by making use of such a phenomenon, can be stored over long periods of time.

The present inventors have conducted research and succeeded in newly developing a recording medium having a structure such that the rays of light from a photographic object are made incident on a portion of the semiconductor substrate to excite charges in that portion. The charges are held in the nitrided film without being discharged and there is simultaneously formed a depletion layer in the semiconductor substrate, the size (depth) of the depletion layer being proportional to the quantity of charge, i.e., the quantity of light received from the object, so that an image is formed using analog changes of the electrostatic capacity of each depletion layer.

The conventional optical photographic method thus become usable for directly two-dimensionally recording a latent image in analog form and therefore the system according to the present invention can be handled in the same manner as in the case where a conventional silver salt film is used. Moreover, the present invention has the effect, among others, of providing an extremely compact photographic apparatus.

For the purpose of the present invention, the rays of light from a photographic object are focused to form an optical image on a recording medium composed of at least a laminate on the surface of a semiconductor substrate and of a conductive layer on the undersurface thereof, the laminate comprising an oxide film, an nitrided film, a photoconductive semiconductor layer and a transparent electrode layer, a predetermined voltage being applied to the conductive layer, whereby charges exited by the light of the optical image in the semiconductor substrate accumulated, between the nitrided film and the oxide film, whereas a depletion layer corresponding to the charges thus accumulated is formed in the semiconductor substrate. Such a phenomenon is utilized to form and hold a latent image over a long periods of time.

That is, the present inventors have conducted research and succeeded in developing a method of forming a so-called latent image, the method comprising applying the optical image from the object to the nitrided film to excite the charges in the portion of the semiconductor substrate thus irradiated after the nitrided film of the recording medium thus structured is energized with the predetermined charges, and the charges are stored in the nitrided film without being discharged while the depletion layer is maintained in the semiconductor substrate.

In this manner, the convention optical photographic method is used to directly two-dimensionally record a latent image in analog form, so that the photographic recording system according to the present invention can be employed in essentially the same manner as in the case where the conventional silver salt film is used. Moreover, the present invention has the effect, among others, of providing an extremely compact photographic apparatus.

DESCRIPTION OF THE PREFERRED EMBODIMENTS

Figure 3:
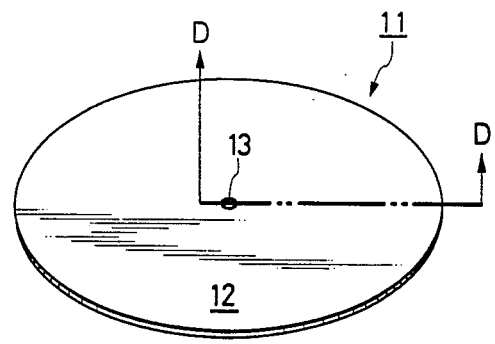
FIG. 3 is an external perspective view showing the outline of a recording medium developed according to the present invention.

Referring to the accompanying drawings, a preferred embodiments of the present invention will now be described. FIG. 3 is an external perspective view of a recording medium constructed according to the teachings of the invention, wherein a discoid recording medium 1 has a recording area 12 formed by laminating recording materials (as described in detail below) and is turned around a center hole 13 to perform recording/playback.

Figure 4A:
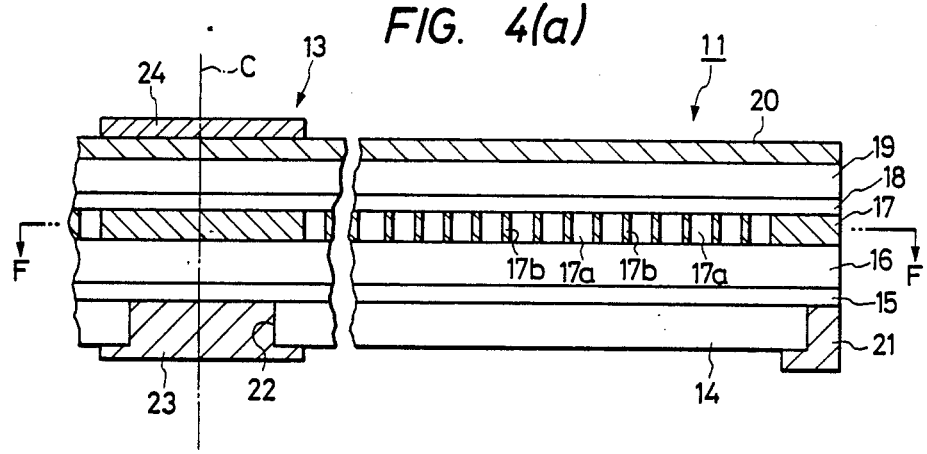
FIG. 4(a) is a sectional view of the principal part of the recording medium of FIG. 3.

Referring to FIG. 4(a), the sectional structure (sectional view taken on line D—D) of the recording medium 1 will be described. On the surface of a transparent substrate 14 made of transparent glass, polycarbonate or the like, there are laminated a transparent conductive layer 15 composed of an $In_{1-x}Sn_x$ oxide film; a photoconductive semiconductor layer 16 mainly composed of a GaAs, a II–VI group compound of ZnS, CdS, CdTe or a IV group semiconductor of amorphous silicon; a semiconductor layer 17 composed of n-type monocrystalline silicon, polysilicon, amorphous silicon or the like, a silicon dioxide ($SiO_2$) film layer 18; a nitrided film ($Si_3N_4$) layer 19; and, if desired, a conductive layer 20 formed by aluminum evaporation.

Figure 4B:
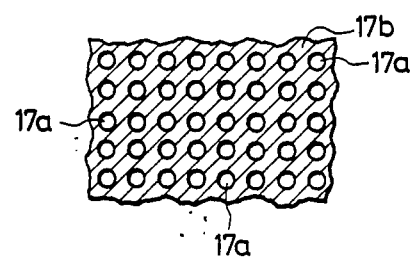
FIG. 4(b) is a cross-sectional view of the principal part of FIG. 4(a)

As shown in FIG. 4(b), moreover, the semiconductor layer 17 is formed of a number of portions 17a composed of n-type monocrystalline silicon and an isolation region 17b for separating the portions 17a from each other, the isolation region being formed by doping with high-density impurities or with a silicon oxide layer obtained through locos oxidation. The shape and arrangement of the portions 17a are properly determined depending on their use and design sepcification.

Referring to FIG. 4(a) again, a conductor 21 is connected to the peripheral edge of the transparent conductive layer and extends via and up to the undersurface of the transparent substrate 14. A through-hole 22 is formed in the central portion of the transparent substrate 14 symmetrically with respect to the center axis C, and a conductor 23 is formed which passes through the hole 22 and contacts the transparent conductive layer 15 from the undersurface. Since the conductors 21, 23 are used as terminals for applying a predetermined voltage to the transparent conductive layer 15 from the undersurface (as described in more detail below), the provision of either one will suffice.

An extra-hard conductor 24 is formed on the surface of the conductive layer 20 in the central portion 13. The conductor 24 is, as also described below, employed to apply the predetermined voltage to the conductive layer 20, and consequently it is unnecessary when the voltage is directly applied.

Figure 5:
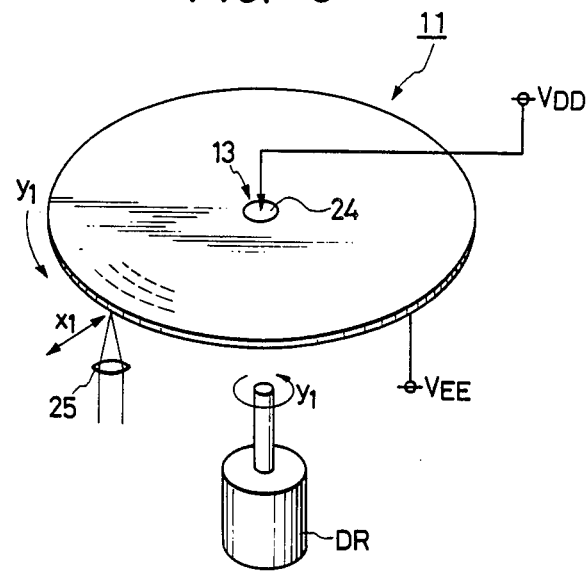
FIG. 5 is a block schematic diagram showing the construction of a recording apparatus embodying the present invention.

FIG. 5 is a block schematic diagram showing the construction of a recording apparatus employing the recording medium 11 thus structured. The recording medium 11, loaded on a support mechanism (not shown), is turned by the driving shaft of a driving gear DR around the center hole 13 in a predetermined direction $y_1$ at a constant speed. Further, a contact terminal (not shown) makes contact with the conductor 24 to apply a predetermined voltage $V_{DD}$ to the conductive layer 20. Moreover, another contact terminal (not shown) makes contact with the conductor 21 and/or 23 to apply a predetermined voltage $V_{EE}$ to the transparent conductive layer 15. In this embodiment, the voltage $V_{DD}$ is set at ground potential (O V) and the voltage $V_{EE}$ in a range of 25 to 40 V; i.e., the potential of the conductive layer 20 is set at a potential which is relatively lower by $-25$ to $-40$ V than that of the transparent conductive layer 15.

An optical system 25, shown schematically in FIG. 5, focuses an input optical signal into an extremely small beam and directs the beam onto the transparent substrate 14 in the form of a spot. A laser beam source may be used as the light source in that case. The input signal may be a digital signal having states of "1" or "0", for instance, indicated by the presence or absence of the light beam of the optical signal. The optical system 25 is also arranged so as to move in the radial direction $x_1$ of the recording medium 11 at a constant speed or with a constant period and, as the recording medium 11 is turned in the direction $y_1$, the transparent substrate 14 is thereby linearly spirally or concentrically scanned.

Figure 2:
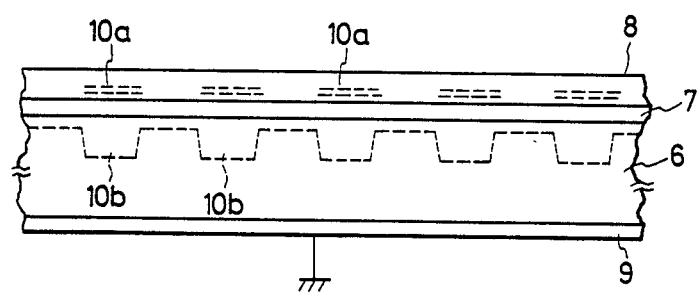
FIG. 2 is a diagram illustrating the principle of a recording method using an apparatus of FIG. 1.
Figure 6:
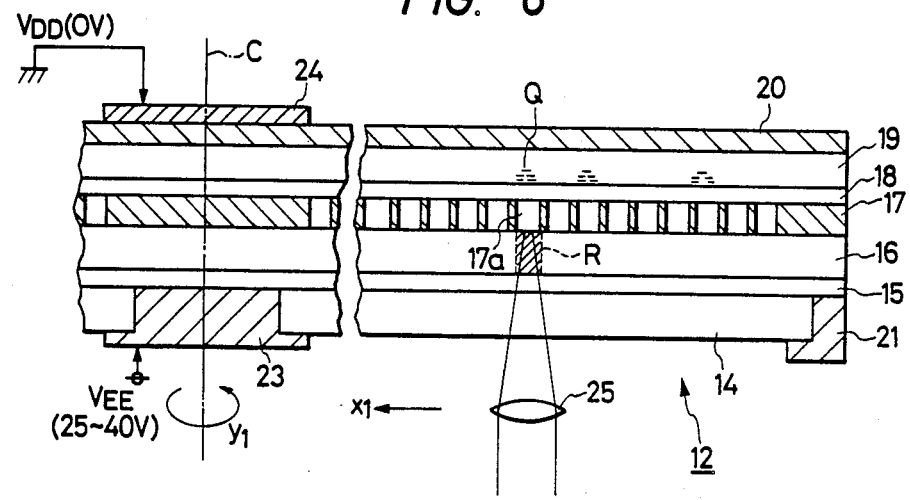
FIGS. 6 and 7 are diagrams illustrating the principal of recording according to the invention.

FIG. 6 is a diagram illustrating the principle of a recording method embodying the present invention as described with respect to FIG. 2(a). After the scanning light beam emerges from the optical system 25, it passes through the transparent substrate 14 and the transparent conductive layer 15 and then reaches the photoconductive semiconductor layer 16. Since the resistance of the portion of the photoconductive semiconductor layer 16 exposed to light (e.g., the portion R in FIG. 6) decreases, a voltage of approximately $V_{EE}$-$V_{DD}$ is applied to the portion 17a of the n-type monocrystalline silicon thereabove. Charges are thus produced in that portion 17a, and simultaneously a depletion layer is formed therein, the charges Q being accumulated via the oxide film 18 in the nitrided film 19 die to the tunnelling effect. Since no charges nor depletion layer are produced or formed in any portion other than those exposed to light, recording the input signal is dependent on the presence or absence of the charges and the depletion layer. The resistance of the photoconductive semiconductor layer 16 decreases only when light is shown thereon and it returns to its former high resistance state when no light is supplied, whereby the charges and the depletion layer are maintained without being extinguished. As the charges and the depletion layer are prevented from being extinguished even though the application of the voltages $V_{DD}$, $V_{EE}$ is suspended upon removing the recording medium 11 from the support mechanism, the recorded data is preserved over long periods of time.

The recording area 12 and the optical system 25 are thus kept from contacting each other, and therefore the recording area is free from frictional wear.

Although the principle illustration in FIG. 6 is directed to digital signal recording, it is also applicable to analog signal recording. Assuming the input signal charges in analog form, the modulated signal optically emerges from the optical system 25 while changing in an analog manner. As the resistance of the photoconductive semiconductor layer 16 (the resistance of the portion subjected to light) also changes with the intensity of illumination of the optical signal, the voltage applied to the portion 17a of the monocrystalline silicon is equivalent to the optical signal. Consequently, a charge distribution corresponding to the input analog recording signal is formed in the nitrided film 19, and simultaneously a depletion layer having a depth distribution corresponding to the charge distribution is also formed. Since the charges and the depletion layer are thus maintained, data can be preserved over long periods of time.

Figure 7:
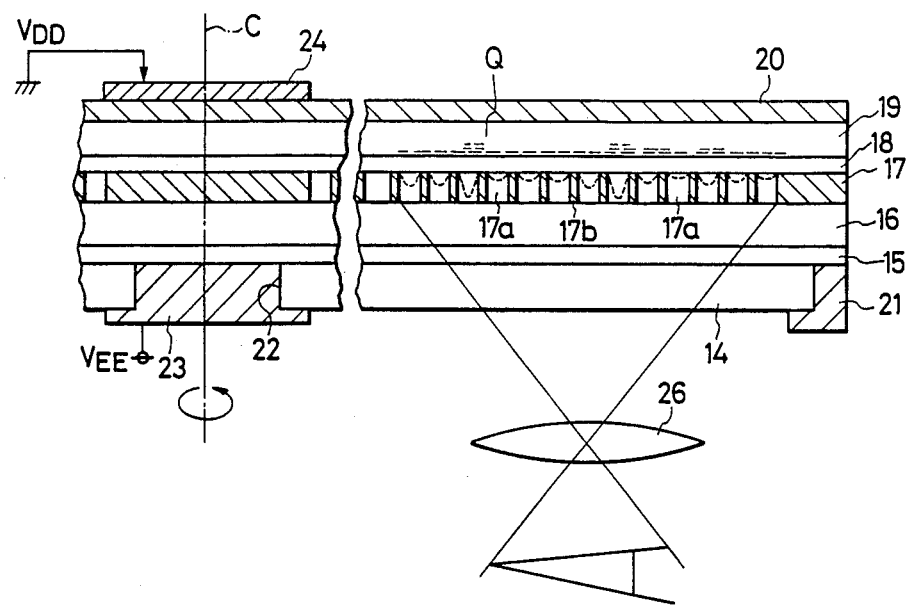

FIG. 7 illustrates another recording method, wherein linear scanning is not employed, and instead an optical image derived from an object A is directly photographed (recorded) two-dimensionally using an optical system 26. As the recording medium in this case is similar to that shown in FIG. 2, components in FIG. 7 are designated by like reference characters in FIG. 2.

When an optical image A is formed through the transparent substrate 14, the distribution of resistance values changes corresponding to the intensity of illumination of the respective portions of the optical image A following on the photoconductive semiconductor layer 16, and a voltage corresponding to the resistance distribution is applied to each portion 17a of the semiconductor layer 17. Accordingly, a depletion layer with a depth corresponding to the voltage distribution (equivalent to the resistance distribution) is formed in each portion 17a, and simultaneously a distribution of charge Q is produced in the nitrided film 19. In this case, although the presence of the isolation layer 17b impedes a completely continuous distribution of charges and depletion layers, it is possible to obtain a high degree of resolution as each portion 17a of monocrystalline silicon is extremely small.

Since this recording method employs no linear scanning of FIG. 5 but planar simultaneous recording. Between successive pictures to be recorded on the medium, the recording medium is turned through a predetermined angle after the image is recorded (photographed) established to ensure that the present and preceding recording areas do not overlap.

Figure 8:
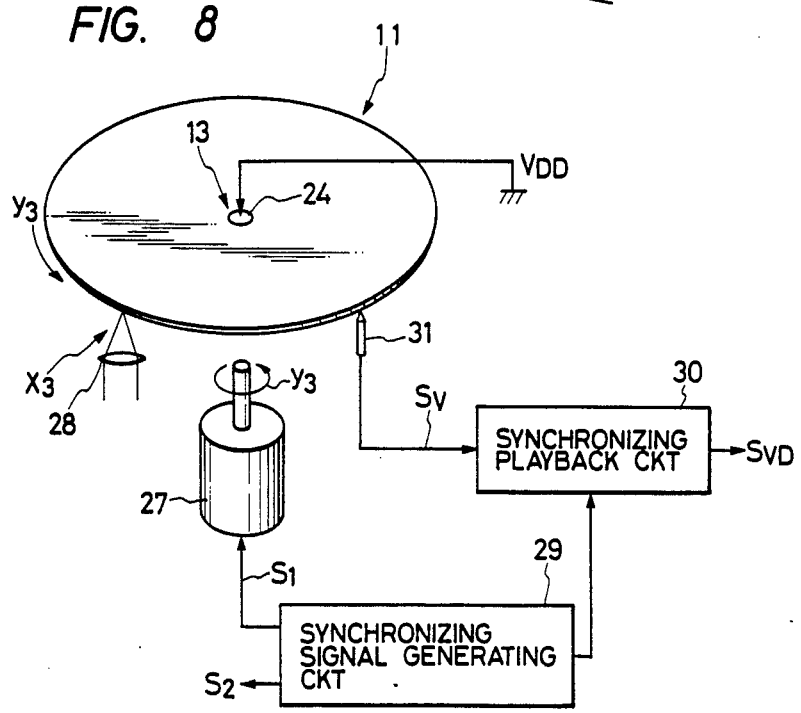
FIG. 8 is a block schematic diagram showing the construction of a playback apparatus embodying the present invention.

Referring to FIG. 8, a description will subsequently be given of a method of playing back a recorded signal from the recording medium 11. FIG. 8 is a block schematic diagram showing the construction of a playback apparatus embodying the present invention, wherein the recording medium 11 loaded on the support mechanism (not shown) is turned by the driving shaft of a driving gear 27 around the center hole 13 in a predetermined direction $y_3$ at a constant speed. Further, a contact terminal (not shown) makes contact with the conductor 24 to apply the voltage $V_{DD}$ (O V) to the conductive layer 20.

An optical system 28 focuses laser beams, having fixed intensities, through the transparent substrate 14. The optical system 28 also moves the irradiated portion in the radial direction $x_3$ of the recording medium 11 so that the recording medium 11 is linearly spirally or concentrically scanned as it is turned in the peripheral direction $y_3$.

A synchronizing signal generating circuit 29, shown in FIG. 8, generates a synchronizing control signal $S_1$ for causing the driving gear 27 to turn the recording medium 11 at a constant speed and a synchronizing control signal $S_2$ for controlling the position irradiated by the light source device 28 so as to cause the irradiated position to move in the radial direction $x_3$ at a constant speed or with a constant period.

A synchronizing playback circuit 30 receives a signal $S_v$ detected by a contact terminal which is connected to the conductor 23 and processes the signal in such a manner as to amplify and shape the waveform of the signal so as to output a playback signal $S_{VD}$. For instance, an analog signal such as a standard television signal may be recorded on the recording medium 11 and, at the time of playback, in which case the synchronizing playback circuit 30 forms and outputs an image signal capable of being displayed by a television monitor.

The principles of playback applicable to the playback apparatus thus constructed will subsequently be described. When the laser beam emerging from the optical system 28 is used to scan the recording area 12, the change of electrostatic capacity resulting from the depletion layer thereby formed in the very small irradiating range (see FIGS. 4, 5) is detected as a change of voltage on a contact terminal 31. As the stored electrostatic charge corresponds to the recorded signal, it can be played back as the detected signal $S_v$ with accuracy. It is preferred for the improvement of playback resolution for the laser beam diameter be small. Moreover, since the charges accumulated in the nitrided film 19 are maintained without being discharged even though the signal is played back, the recording medium can be played back any number of times desired.

To erase the recording medium, it is possible to discharge the stored charges within the nitrided film 19 by irradiating charge particles on the recording medium 11 or by applying to the recording medium a voltage opposite to polarity to that applied at the time of recording (as shown in FIG. 3).

As set forth above, in this embodiment, recording is performed by forming charges and the depletion layer in the nitride film and the semiconductor substrate via the photoconductive semiconductor layer whose resistance changes with the intensity of applied light, whereas playback is performed by detecting the electrostatic capacity of the depletion layer so that recording/playback on a noncontact basis can be carried out, thus preventing damage to the recording medium. Furthermore, the recording medium, although it is simple in structure provides an excellent recording effect and makes possible not only long-term data preservation, but also high-density recording. In addition, the transparent substrate 14 ensures the mechanical strength of the recording medium 11 and has superior structural properties.

In the recording method illustrated in FIGS. 5 and 6 the optical signal from the optical system 25 changes proportionally with the input signal and the voltages $V_{DD}$, $V_{EE}$ are made constant. On the contrary, if the intensity of the light from the emerging from the optical system 25 is made constant, it is also possible to carry out recording by changing the voltage $V_{DD}$-$V_{EE}$ applied between the conductive layer 20 and the transparent conductive layer 15 is proportion to the input signal.

Although the recording and playback apparatuses have been separately described for the convenience of description of the above embodiment, an apparatus capable of integrally recording and playback can readily be constructed, provided the optical system and the driving gear are used commonly.

Figure 1:
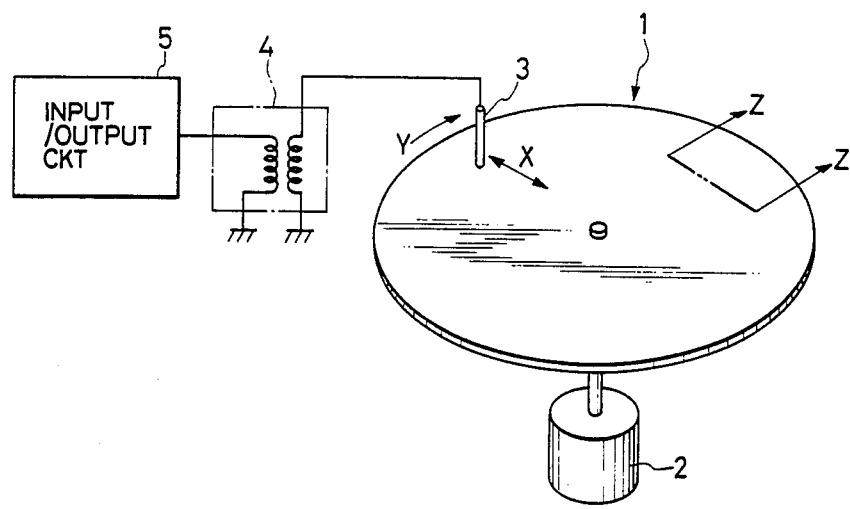
FIG. 1 is a block schematic diagram showing the construction of a conventional recording apparatus.

On the other hand, the accumulated charge signals can be read by means of the stylus as in the conventional case of FIG. 1 after being written by supplying a potential using the charging method instead of providing the conductive layer 20 of FIG. 5.

As set forth above, the semiconductor recording medium according to the present invention is provided with at least the laminate comprising the transparent conductive layer having translucent and conductive properties, the photoconductive semiconductor layer whose resistance changes with the quantity of light received, the plurality of semiconductor layers mutually electrically separated from each other, the oxide film, the nitrided film and the conductive layer having conductive properties such that recording can be effected by applying the predetermined voltage between the transparent conductive layer and the conductive layer causing the input optical signal to be incident thereon. Accordingly, recording/playback on a noncontact basis can be implemented while the recording medium is prevented from frictionally wearing, which has the excellent effect of preserving data and the like over long periods of time.

Figure 9:
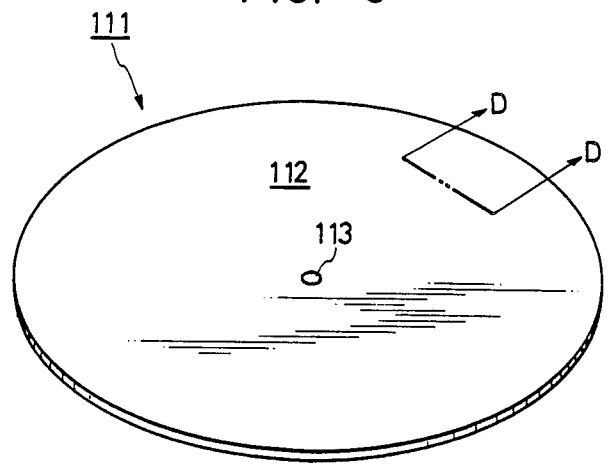
FIG. 9 is an external perspective view showing the outline of a recording medium developed according to the present invention.

Referring to the accompanying drawings, another preferred embodiment of the present invention will be described. FIG. 9 is an external perspective view of a second embodiment of the recording medium of the invention, wherein a discoid recording medium 111 has a recording area 112 thereon formed by laminating recording materials (As described below) and which is turned around the center hole 113 for recording/playback.

Figure 10:
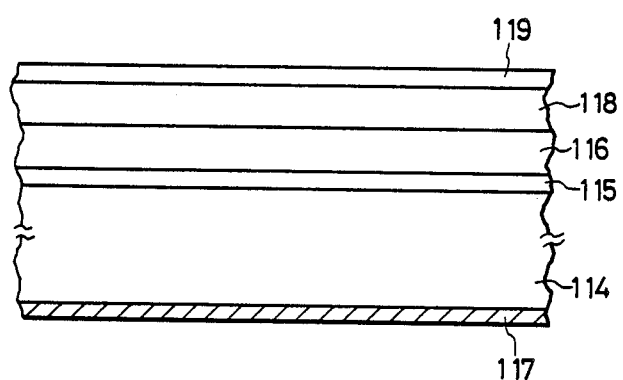
FIG. 10 is a sectional view of a principal part of the recording medium of FIG. 9.

Referring to FIG. 10, the sectional structure (sectional view taken along a line D—D) of the recording area 112 will be described. On a semiconductor substrate 114 composed of an n-type monocrystalline silicon wafer, there are laminated a silicon dioxide film ($SiO_2$) layer 115 and a nitrided film ($Si_3N_4$) layer 116, whereas the conductive layer 117 is formed by aluminum evaporation on the undersurface thereof. Further, a photoconductive semiconductor layer 118 composed of, e.g., a GaAs semiconductor, a III-V group compound such as GaAlAs and GaAsP or a II-VI group compound such as ZnS, CdS and CdTe, and a transparent conductive layer 19 such as $In_{1-x}Sn_x$ are laminated on the surface of the nitrided film 116.

Figure 11:
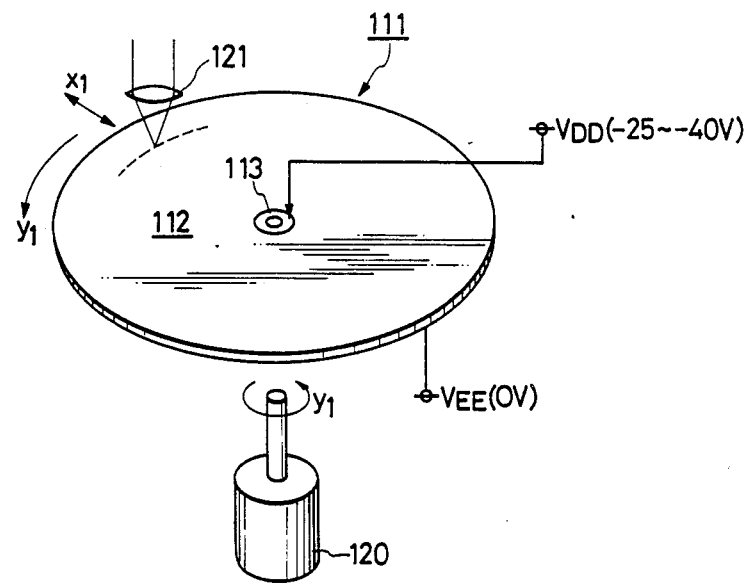
FIG. 11 is a block schematic diagram showing the construction of a recording apparatus embodying the present invention.

FIG. 11 is a block schematic diagram showing the construction of a recording apparatus employing the recording medium 111 thus structured. The recording medium 111 loaded on a support mechanim (not shown) is turned by the driving shaft of a driving gear 120 on the central portion 113 in a predetermined direction $y_1$ at a constant speed. Further, a contact terminal (now shown) makes contact with the transparent conductive layer 119 to apply a predetermined voltage $V_{DD}$ to the conductive layer 120, whereas another contact terminal makes contact with the conductive layer 117 to apply a predetermined voltage $V_{EE}$, i.e., the voltage $V_{EE}$-$V_{DD}$ is applied between the transparent conductive layer 119 and the conductive layer 117 to set the potential of the transparent conductive layer 119 lower by $-25$ to $-40$ V than that of the conductive layer. In this embodiment, the voltage $V_{EE}$ is set at ground potential (O V) and the voltage $V_{DD}$ at $-25$ to $-40$ V.

If the contact terminal were allowed to directly contact the transparent conductive layer 119 and the conductive layer 117, the contact face would be mechanically worn. In order to prevent such friction wear, an extra-hard conductor may be provided on the surface of the transparent conductive layer 119 in the portion not used for recording i.e., out of the recording area 112, for example, close to the central portion 113, so that the contact terminal slides on the conductor. In order to prevent the conductive layer 117 from wearing, a conductive rotary plate may otherwise be employed to contact the recording medium 111 simultaneously when the recording medium 111 is loaded on the support mechanism to apply the voltage $V_{EE}$ thereto via another rotary member.

An optical system 121 focuses the modulated input optical signal into an extremely small beam and directs the beam onto the recording area 112 in the form of a spot. A laser beam source may be as the input light source. If the input signal is a digital signal having states of "1" and "0", modulation may be performed depending on the presence or absence of the light beam of the optical signal. The optical system 121 is also arranged so as to be moved in the radial direction $x_1$ of the recording medium 111 at a constant speed or with a constant period and, as the recording medium 111 is turned in the direction $y_1$, the recording area 112 is spirally or concentrically scanned.

Figure 12:
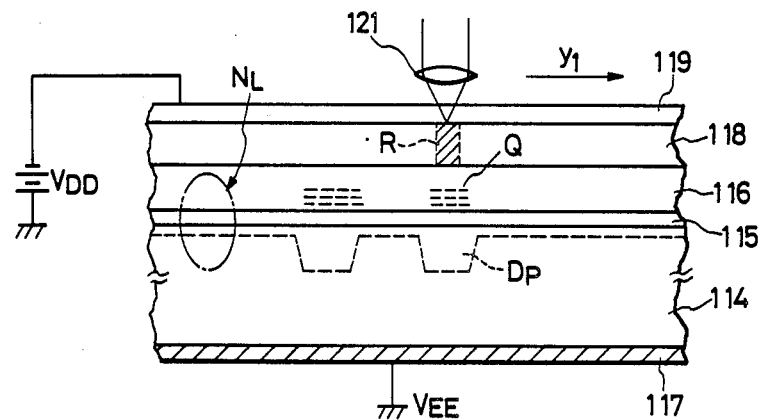
FIGS. 12 and 13 are diagrams illustrating the principles of recording method of the invention.

Referring to FIG. 12, a description will subsequently be given of the principle of a further embodiment of a recording method embodying the present invention. There is shown in FIG. 12 a sectional view corresponding to FIG. 10, wherein when the light beam from the optical system 121 moves in the direction $Y_1$ with respect to the recording medium 111, it passes through the transparent conductive layer 119 and reaches the photoconductive semiconductor layer 118. The voltage $V_{DD}$ is thus applied to the nitrided film 115 positioned beneath the portion (e.g., portion R in FIG. 12) on which the light is incident because the photoconductive semiconductor layer 118 has a resistance which decrease when irradiated. The voltage causes the generation of charges Q in the layer beneath the nitrided film 115, and simultaneously a depletion layer $D_p$ whose depth corresponds to the quantity of charges Q. On the other hand, no charges nor depletion layer is produced in a potion NL where no light is applied, and hence whether or not a signal is written depends on the presence or absence of the charges and the depletion layer. Moreover, the change of resistance occurs only when the light is incident on the photoconductive semiconductor layer 118 and, although the resistance is restored to its original high level when scanning is terminated, the charges and the depletion layer thus generated are maintained. Furthermore, the charges and the depletion layer are not eliminated even though the application of the voltage $V_{DD}$ is stopped removing the recording medium 111 from the support mechanism so that the stored data or the like can be held over long periods of time. Since no conventional stylus is employed for recording, the recording area of the recording medium and the optical system are kept completely out of contact with one another, whereby the recording medium is prevented from being damaged.

Figure 13:
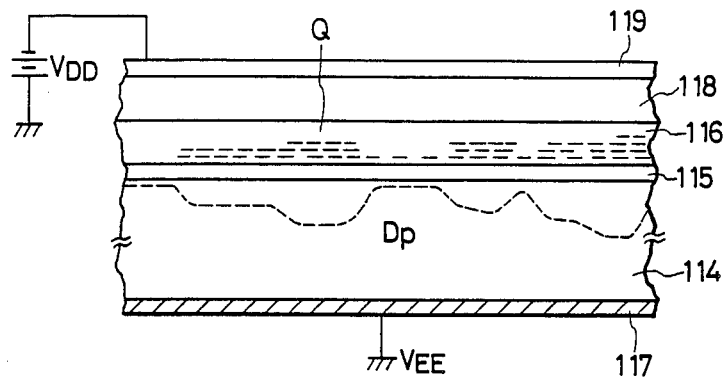

Although the principle illustrated in FIG. 12 is directed to digital signal recording, as already explained, the invention is also applicable to analog signal recording. FIG. 13 shows an example of a recorded analog signal and, when an optical signal (whose illuminance continuously changes) modulated by the analog signal is recorded employing the method shown in FIG. 11, the resistance of the photoconductive semiconductor layer 118 changes inversely proportionally to the illuminance of the light. As shown in FIG. 13, accordingly, a charge distribution Q corresponding to the illuminance of the optical signal is simultaneously produced in the nitrided film 115 and the depletion layer $D_p$ corresponding in distribution to the charge distribution Q. An analog signal can thus be recorded which ensures a wide range of application of the present invention.

Figure 14:
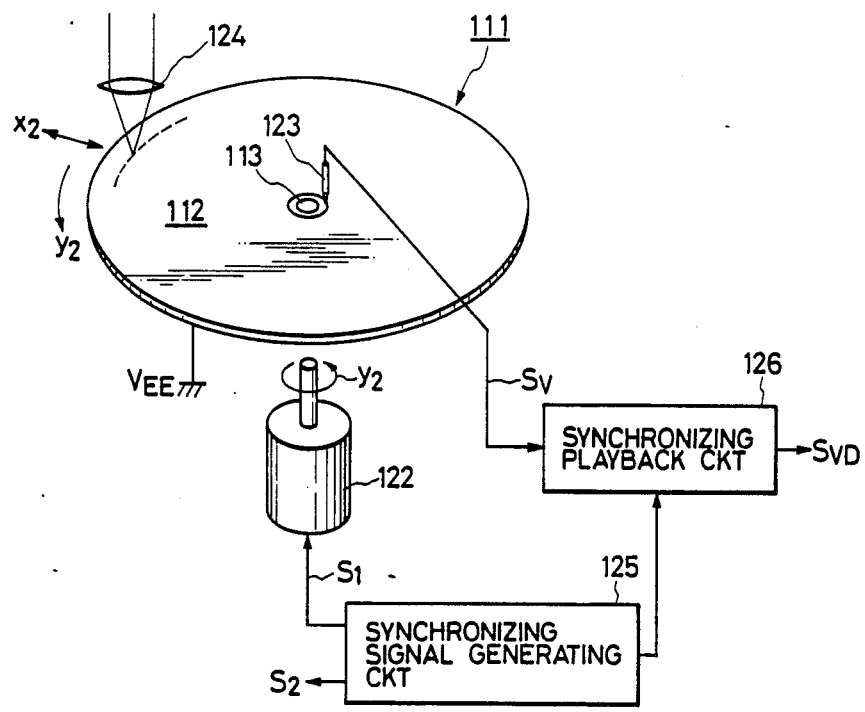
FIG. 14 is a block schematic diagram showing the construction of a playback apparatus embodying the present invention.

Referring to FIG. 14, a description will be given of a method of playing back a recorded signal from the recording medium 111. FIG. 14 is a block schematic diagram showing the construction of a playback apparatus embodying the present invention.

When the recording medium 111 is loaded on the support mechanism (not shown), it is turned by the driving shaft of a driving gear 122 around the center hole 113 in a predetermined direction $y_2$ at a constant speed. A contact terminal 123 makes contact with a wear-resistance conductor provided around the center hole 113, whereas another contact terminal (not shown) makes contact with the conductive layer 117 to apply the voltage VEE (O V in this embodiment) to the conductive layer 117. In order to prevent the recording medium 111 from wearing because of these contact terminals, the recording apparatus shown in FIG. 11 may be utilized.

A light source device 124 emits a laser beams of fixed intensity, which is focused and directed onto the recording area 112, the irradiated portion being moved in the radial direction $x_2$ of the recording medium 111.

A synchronizing signal generating circuit 125 generates a synchronizing control signal $S_1$ to cause the driving gear 122 to turn the recording medium 111 at a constant speed and a synchronizing control signal $S_2$ to cause the portion irradiated by the light source 124 move in the radial direction $x_2$ at a constant speed or with a constant period. Consequently, the recording area 112 is spirally on concentrically scanned by the laser beam from the light source 124. The scanning timing is synchronous with the scanning timing for recording by the recording apparatus shown in FIG. 11.

A synchronizing playback circuit 126 processes a signal in such a manner as to amplify and shape the waveform of the signal on receiving the signal $S_v$ detected by the contact terminal 123 and outputs a playback signal $S_{VD}$. When, e.g., an analog signal such as a standard television signal is recorded and played back, the synchronizing playback circuit 126 forms and outputs an image signal compatible with a television signal used for driving a television monitor or the like.

The principle of playback using the playback thus constructed will subsequently be described. When the laser beam from the light source 128 scans the recording area 112, a change of electrostatic capacity resulting from the depletion layer (see FIGS. 12, 13) is detected at the contact terminal 123 as a change of voltage. As the electrostatic capacity corresponds to the recorded signal, it is played back as the detected signal $S_v$ with accuracy. It is preferred for improving the playback resolution for the diameter of the laser beam to be mad every small. Moreover, since the charges accumulated in the nitrided film 116 are maintained even though the signal is played back, the recording medium can be played back any number of times.

To erase this recording medium, the charges with in the nitrided film 116 can be discharged by irradiating the recording medium 111 with charged particles or by applying to the recording medium 111 a voltage opposite in polarity to that applied at the time of recording as shown in FIG. 11.

As set forth above, in this embodiment, recording is performed by forming the charges and the depletion layer in the nitrided film and the semiconductor substrate via the photoconductive semiconductor layer whose resistance changes with the intensity of the received light, whereas playback is performed by detecting the electrostatic capacity of the depletion layer using a reading light beam, so that recording/playback on a noncontact basis can be implemented with no damage to the recording medium. Furthermore, the recording medium, although it is simple in structure provides an excellent recording effect and makes possible not only long-term data preservation but also high-density recording.

Figure 15:
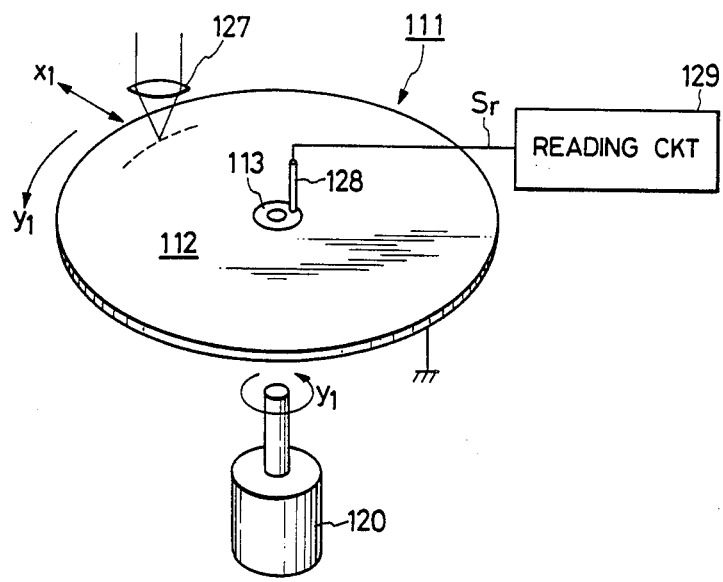
FIG. 15 is a block schematic diagram of another recording apparatus embodying the present invention.

FIG. 15 is a block schematic diagram of another recording apparatus embodying the present invention, wherein like reference characters designate like or corresponding parts in FIG. 11. As shown in FIG. 15, a constant-intensity light beam a laser beam source is focused by an optical system 127 and directed onto the recording area 112 of the recording medium 111. The irradiated point is moved in the radial direction $x_1$ of the recording medium 111. Accordingly, the irradiated point is concentrically or spirally scanned as the recording medium 111 is turned by the driving gear 120 in the direction $y_1$.

A stylus 128 contacts and slides on the wear-resistance conductor provided on the transparent conductive layer 119 of the recording medium 111 to apply an input signal $S_r$ supplied by a reading circuit 129 to the transparent conductive layer 119. That is the primary difference between this recording apparatus and that shown in FIG. 11 lies in the fact that the intensity of illumination of the scanning light beam is constant and the voltage applied between the transparent conductive layer 119 and the conductive layer 117 is changed according to changes in amplitude of the input signal. Consequently, it is also possible to record digital and analog signals as shown in FIG. 12 or 13. With this recording method, the dynamic range of the signal $S_r$ is set at $-25$ to $-40$ V with respect to the voltage of the conductive layer 117.

Although the above-described embodiment relates to a method of recording data by scanning the recording medium, the present invention is also applicable to a photographic apparatus such as a camera or the like.

Figure 16:
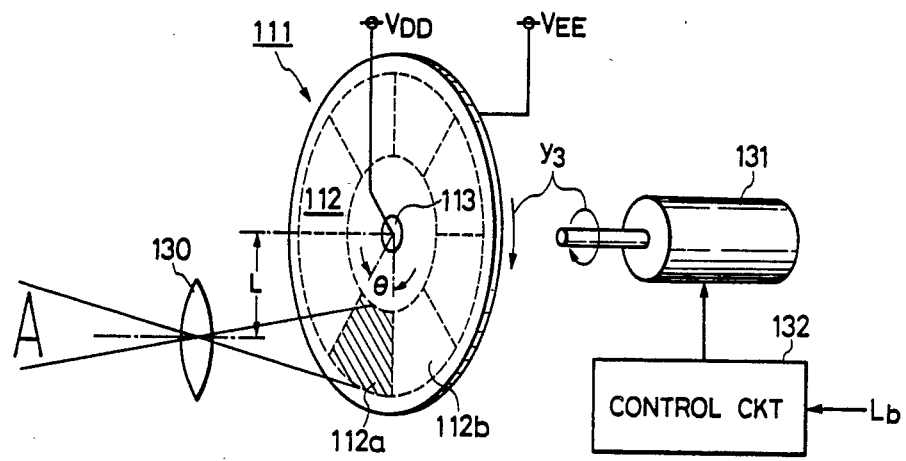
FIG. 16 is a block schematic diagram of still another recording apparatus embodying the present invention.

Referring to FIG. 16, another embodiment of the inventive recording method will be described.

FIG. 16 is a block schematic diagram showing the construction of a recording apparatus employing the recording medium 111, wherein the recording medium 111 is arranged so that light incident via an optical system 130 is focused to form an optical image of an object A on the recording area 112. The recording medium 111, whose central portion 113 is supported by the rotary shaft of a driving gear 131, is turned in a peripheral direction $y_3$ stepwise through a predetermined angle $\theta$ of rotation. The optical axis of the optical system 130 is also shifted by a predetermined distance L from the axis of rotation around the center hole 113, whereby data can be recorded on the circular portion (indicated by broken circular lines) of the recording area 112 as the recording medium 111 is turned. Since the recording medium 111 is turned through the angle $\theta$ each time an image is recorded on the medium, a plurality of images free from overlap are recorded in the respective recording portions 112a, 112b.

A control circuit 132 operates to direct the driving gear 131 to turn the recording medium through the angle $\theta$ each time, e.g., synchronously with a signal $L_b$ generated when the release button of an electronic still camera incorporating these elements is depressed for photographing.

When the recording medium 111 is loaded on the driving gear 131, the contact terminal (not shown) contact the transparent conductive layer 19 to apply the voltage $V_{DD}$, whereas the other contact terminal contacts the conductive layer 117 to apply the voltage $V_{EE}$. In other words, the voltage $V_{EE}$-$V_{DD}$ is applied between the transparent conductive layer 119 and the transparent conductive layer 119, which is lower by $-25$ to $-40$ V than the conductive layer 117. In this embodiment, the voltage $V_{EE}$ is set at ground potential (0 V) and the voltage $V_{DD}$ within the range of $-25$ to $-49$ V.

If the contact terminal is allowed to directly contact the transparent conductive layer 119 and the conductive layer 117, the contact face will wear. In order to prevent such frictional wear, an extra-hard conductor may be provided on the surface of the transparent conductive layer 119 in the area not used for recording, e.g., close to the center hole 113, to improve the wear resistance of the transparent conductive layer 119 by letting the contact terminal slide on the conductor. In order to prevent the conductive layer 117 from wearing, a conductive rotary plate may otherwise be allowed to contact the recording medium 111 simultaneously when the recording medium 111 is loaded on the support mechanism to apply the voltage $V_{EE}$ thereto via another rotary mechanism.

When an optical image of the object is simultaneously directed onto the recording medium, a planar distribution of charges and depletion layer as shown in FIG. 13 are formed in accordance with the pattern of the optical image, and recording is thereby effected. Accordingly, a recording apparatus which operate similarly to a camera employing conventional silver salt film is obtained. Moreover, it is possible to provide a photographic apparatus having an extremely simple construction because no complicated signal processing circuit or magnetic recording device as required in a conventional electronic still camera or video camera is necessary.

Figure 17:
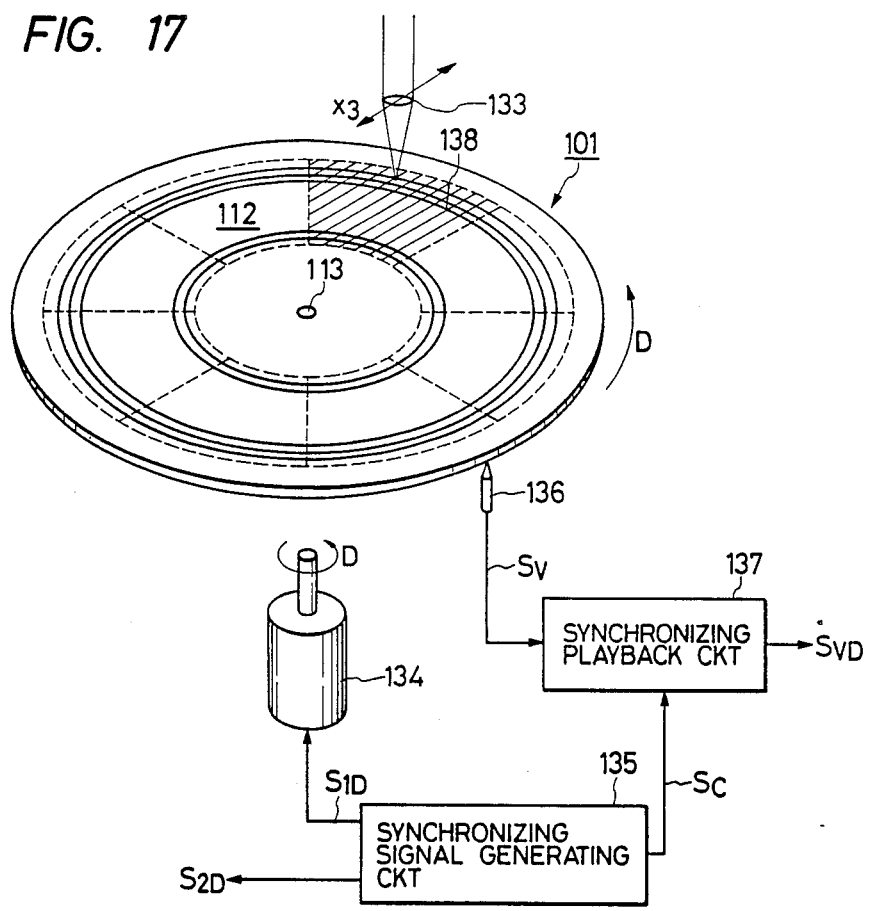
FIG. 17 is a block schematic diagram of another playback embodying the present invention.

Referring to FIG. 17, a playback method for reproducing the image recorded on the recording medium 111 will be described.

FIG. 17 is a block schematic diagram of another playback apparatus embodying the present invention, wherein an optical system 133 is used to finely focus a laser beam of constant intensity on the recording area 112 of the recording medium 111. The irradiation point is moved in the radial direction $x_3$ of the recording medium 111. The recording medium 111 is turned by a driving gear 134 around its center hole 113 in a predetermined direction D at a constant speed. A synchronizing signal generating circuit 135 generates a synchronizing control signal $S_{10}$ for causing the driving gear 134 to turn the recording medium 111 at a constant speed and a synchronizing control signal $S_{20}$ for causing the light source device 133 to move the irradiated point in the radial direction $x_3$ at a constant speed or with a constant period. Consequently, the laser beam from the light source device 133 scan the recording area 112 as the recording medium 111 turns; i.e, the irradiated point spirally or concentrically scans the area where a latent image has been formed according to the synchronizing control signal $S_{20}$. In this case, e.g., 525 scanning track are provided, which are equivalent in number to the number of scanning lines in the standard NTSC television system.

A stylus 136 is composed of an extra-hard conductive material and is used to detect changes of the electrostatic capacity according to the same principle as in the case of the apparatus of FIG. 14. A synchronizing playback circuit 137 receives the signal $S_v$ detected by the stylus 136 and forms the image signal $S_{VD}$ that can be played back; that is, the synchronizing playback circuit 137, supplied by the synchronizing signal generating circuit 135 with a clock signal $S_c$ synchronous with the synchronizing control signals $S_{10}$, $S_{20}$, determines which one of the scanned portions of the latent image is responsible for the detected signal $S_v$ and selectively produces the image signal $S_{VD}$ to be played back. More specifically, the detected signal $S_v$ is a so-called linear sequential signal. When the image recorded in the portion 138 marked with radial broken lines in FIG. 17 is played back, for instance, a signal obtained by scanning any other recording area is removed from the detected signal $V_s$ and the signal $S_{VD}$ is applied to a television monitor to thereby reproduce an image by means of horizontal and vertical scanning.

As set forth above, when the stylus 136 is brought close to the conductive layer 117 to detect changes of electrostatic capacity, if it comes in contact with the turning recording medium 111, the latter will wear. Therefore, in order to prevent such wear, the wear resistance of the surface of the conductive layer 117 can be increased or a rotary transformer can be used whereby the primary winding of the rotary transformer is connected to the conductive layer 117. The detected signal $S_v$ will then be generated on the secondary winding of the transformer as the result of magnetic coupling to the synchronizing playback circuit 137.

Although the recording and playback apparatuses are separately described for convenience of description in the above embodiment, an apparatus cable of integrally recording and playback can readily be constructed. In such an apparatus, the optical system and the driving gear should be used commonly for recording and playback.

As set forth above, the recording medium according to the present invention is composed of at least the laminate on the surface of the semiconductor substrate, the laminate comprising the oxide film nitrided film, photoconductive conductor layer and the transparent conductive layer, and the conductive layer on the undersurface thereof, whereby recording is effected by directing image light on the surface thereof to give rise to the charges and the depletion layer in the nitrided film and the substrate. Playback is carried out by detecting the electrostatic capacity of the depletion layer. Accordingly, recording/playback can be performed on a noncontact basis, which has the excellent effect of not only preserving data over long periods of time, but also making the overall system operation quite easy.

Referring to the accompanying drawings, another embodiment of the present invention will be described. In this embodiment, a description will first be given of a recording mechanism for photographing and then an image playback mechanism.

Figure 18:
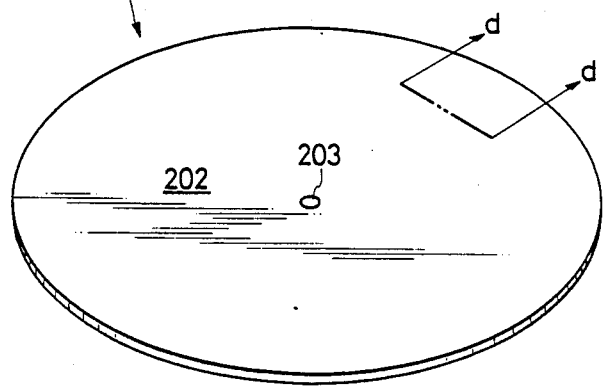
FIG. 18 is an external perspective view showing the structure of a recording medium for use in the present invention.

FIG. 18 is an external perspective view of a recording medium for use in this embodiment, wherein a discoid recording medium 201 has a recording area 202 thereon formed by laminating recording materials (as described below) and which is turned around a center hole 203 at the time of recording/playback.

Referring to FIG. 18, the sectional structure (sectional view taken along a line d—d) of the recording area 202 will be described. On a semiconductor substrate 204 composed of an n-type monocrystalline silicon wafer, there are laminated a silicon dioxide film ($SiO_2$) layer 205 and a nitrided film ($Si_3N_4$) layer 206, whereas a conductive layer 207 is formed by aluminum evaporation on the undersurface thereof. Further, a photoconductive semiconductor layer 208 composed of e.g., mainly a GaAs semiconductor, a III–V group compound such as GaAlAs and GaAsP, a II–VI group compound such as AnS, CdS and CdTe or a IV group compound such as amorphous silicon, and a transparent conductive layer 209 such as an $In_{1-x}Sn_x$ oxide having translucent and conductive properties are laminated on the surface of the nitrided film 206.

Figure 20:
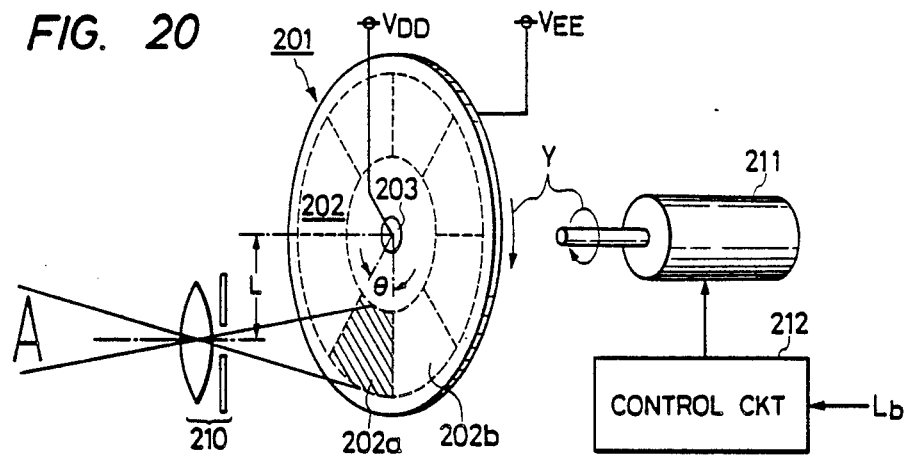
FIG. 20 is a block schematic diagram of a recording system for use in an electronic still camera according to the present invention.

FIG. 20 is a block schematic diagram showing the construction of a recording apparatus employing the recording medium 201, wherein the recording medium 201 is arranged so that light incident via an optical system 210 composed of a photographic lens, a shutter, etc., is focused to form an optical image of an object A on the recording area. The recording medium 201, whose center hole 203 is supported by the rotary shaft of a driving gear 211, is turned stepwise in a peripheral direction Y through steps of a predetermined angle $\theta$ of rotation. The optical axis of the optical system 210 is also shifted by a predetermined distance L from the axis of rotation of the center hole 203, whereby data can be recorded on the circular portion (indicated by broken circular lines) of the recording area 202 as the recording medium 201 is turned. Since the recording medium 201 is turned through the angle $\theta$ for each recording operation, a plurality of images free from overlap are secured in the respective recording portions 202a, 202b, .

A control circuit 212 operates to cause the driving gear 211 to turn the recording medium through the angle $\theta$ for each recording operation, e.g., synchronously with a signal $L_b$ generated when the release button of an electronic still camera incorporating the apparatus is depressed for photographing.

When the recording medium 201 is loaded on the driving gear 231, a contact terminal (not shown) contacts the transparent conductive layer 209 to apply a voltage $V_{DD}$, whereas another contact terminal contacts the conductive layer 207 to apply a voltage $V_{EE}$. In other words, the voltage $V_{EE}$-$V_{DD}$ is applied between the transparent conductive layer 209 and the conductive layer 207 so as to set the potential of the transparent conductive layer 209 lower by $-25$ to $-40$ V than the conductive layer 207. In this embodiment, the voltage $V_{EE}$ is set at ground potential (O V) and the voltage $V_{DD}$ within the range of $-25$ to $-49$ V.

If the contact terminal is allowed to directly contact the transparent conductive layer 209 and the conductive layer 207, the contact face will wear. In order to prevent such frictional wear, an extra-hard conductor may be provided on the surface of the transparent conductive layer 209 in the portion not used for recording e.g, an area close to the center hole 203 to improve the wear resistance of the transparent conductive layer 209 by making the contact terminal slide on the conductor.

In order to prevent the conductive layer 207 from wearing, a conductive rotary plate (not shown) may otherwise be made to contact the recording medium 201 simultaneously when the recording medium 201 is loaded on the support mechanism to apply the voltage $V_{EE}$ thereto via another rotary mechanism.

Figure 19:
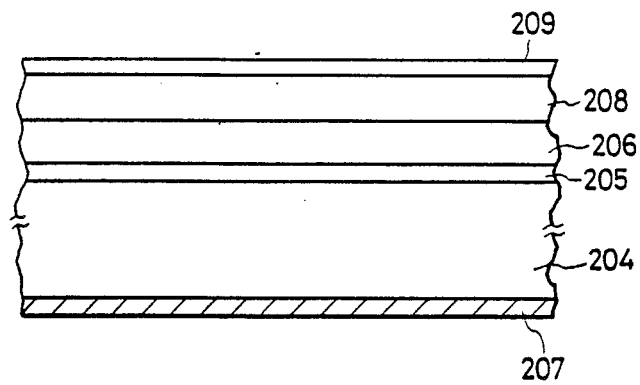
FIG. 19 is a sectional view of a principal part of the recording medium of FIG. 18.
Figure 21:
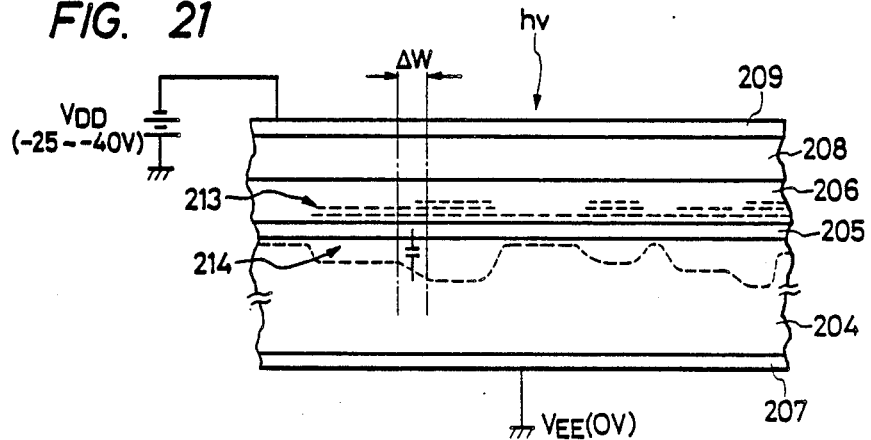
FIG. 21 is a diagram illustrating the principles of recording using the recording system of FIG. 20.

Referring to FIG. 21, a method of forming an image according to the present invention will subsequently be described, wherein there is shown a sectional view corresponding to FIG. 19. When the light incident via the optical system 210 is focused to form an optical image on the transparent conductive layer 209, the optical image is passed through the transparent conductive layer 209 and directed onto the high resistance optical semiconductor layer 208. Since the resistance of photoconductive semiconductor layer 208 changes in analog form proportionally to the intensity of illumination, a charge distribution 213 corresponding to a change of voltage is produced and a depletion layer 214 resulting from the charge distribution is simultaneously formed via the oxide film 205 in the semiconductor substrate 204; i.e., the charge distribution and the change of the depletion layer correspond to a latent image. Even when the application of the voltages $V_{DD}$, $V_{EE}$ is stopped by removing the recording medium from the system after the termination of photographing, the latent image is not erased but maintained. The charges are accumulated without being erased and accordingly preserved over long periods of time.

Figure 22:
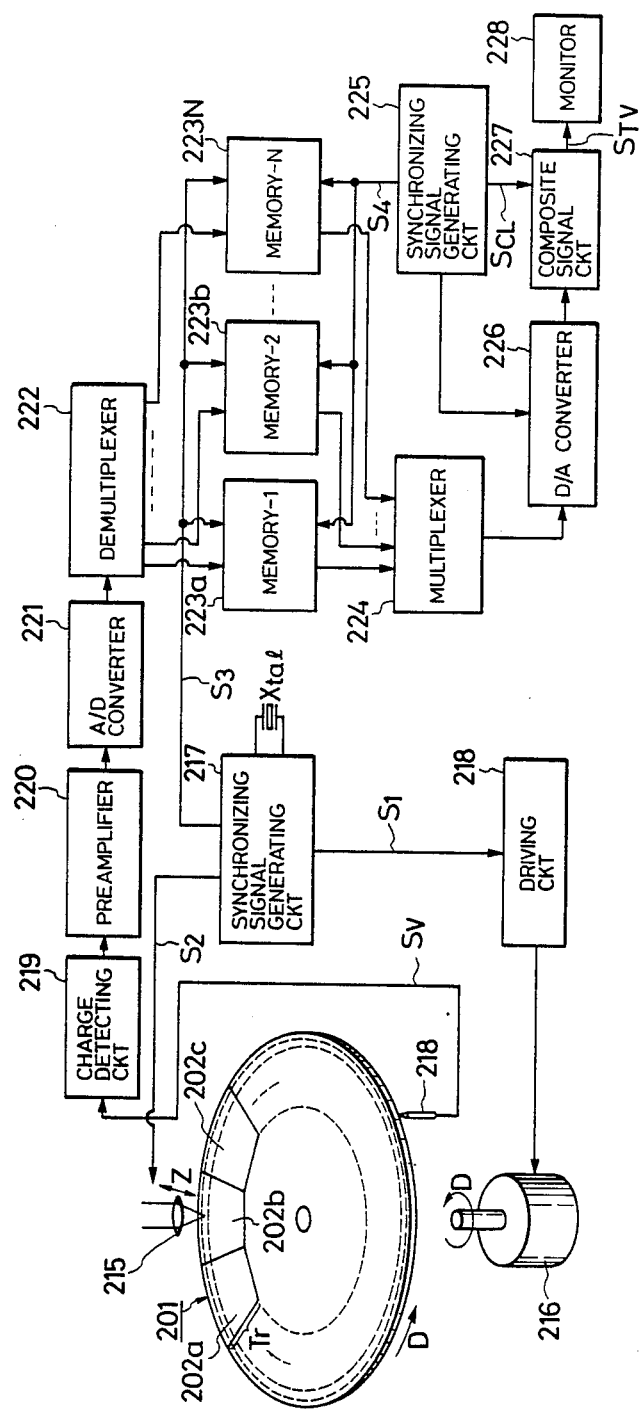
FIG. 22 is a block schematic diagram of a playback apparatus embodying the present invention.

Referring to FIG. 22, a playback mechanism for reproducing an image from the recording medium 201 after photographing will subsequently be described.

As shown in FIG. 22, an optical system 215 is used to focus a laser beams having a fixed intensity and to direct the beam on the recording area 202 of the recording medium 201. The position of the beam thus formed is moved in the radial direction Z of the recording medium 201. The recording medium 201 is turned by a driving gear 216 on the center hole 203 in a predetermined direction D at a constant speed. A synchronizing signal control circuit 217 supplies a synchronizing control signal $S_1$ at a fixed timing to a driving circuit 218 for causing the driving gear 216 to rotate at a constant speed and generates a synchronizing control signal $S_2$ for moving the irradiated beam position synchronously with the synchronizing signal $S_1$ at a constant speed or with a constant period (e.g, each time the recording medium turns once) at constant distant intervals in the radial direction Z. Further, the circuit supplies a synchronizing signal $S_3$ synchronous with the signals $S_1$, $S_2$ to a signal playback system (as described in more detail below). Accordingly, the laser beam from the optical system 215 is used to scan the recording area 202 as the recording medium 201 turns once and scan the area bearing the latent image spirally or concentrically. For instance 525 tracks for linear scanning are provided, which corresponds in number Tr to the number of scan lines in the standard NTSC television system.

A stylus 218 composed of extra-hard conducting material is used to detect changes of electrostatic capacity resulting from the scanning, i.e., the distribution of electrostatic capacity resulting from the depletion layer (see FIG. 21) formed within an extremely small range because of irradiation when the scanning is conducted with the optical system 215. Since the electrostatic capacity corresponds to the latent image recorded, the detected signal $S_y$ accurately represents the latent image.

The playback mechanism includes a charge detecting circuit 219 for detecting and converting the detected signal $S_y$ into an electric signal, a preamplifier 220 for amplifying the signal thus converted at a processable level, an A/D converter 221, and a demultiplexer 222 for switching the output channel according to the synchronizing signal $S_3$ and causing memories 223a, 223b . . . $223_N$ to store playback signals from the corresponding recording portions 202a, 202b, 203c, of the recording medium 201. When the recording area 202 of the recording medium 201 is scanned in terms of the total number of tracks Tr, the data of the images thus photographed are stored in the memories 223a, 223b, . . . $223_N$ on an image basis.

The playback mechanism further includes a multiplexer 224 for producing the image data read out from one memory selected synchronously with a synchronizing signal $S_4$ from a synchronizing signal generating circuit 225 and supplying the data to a D/A converter 226, and a composite signal circuit 227 for forming an image signal $S_{TV}$ in the standard television system format according to the playback signal converted by the D/A converter 226 into an analog signal. The image signal $S_{TV}$ supplied to a television monitor 228 is usable for reproducing a sheet of still pictures, whereas the synchronizing signal generating circuit 225 produces a synchronizing signal $S_{CL}$ for setting a blanking period necessary for forming the image signal $S_{TV}$.

As set forth above, the electronic still camera system according to this embodiment is provided with a recording system of extremely simple construction (see FIG. 20), and can thus be made far lighter and more compact than any conventional electronic still camera. Moreover, the recording area 202 offers greater resolution than that offered by the picture elements of a CCD or MOS type pickup, and the area irradiated by the optical system 215 for playback can readily be minimized so that an image of high resolution is obtainable.

Although linear scanning is conducted using the optical system 215 on a noncontact basis in the playback system of FIG. 22, playback is also possible by linearly scanning the recording area 202 using the stylus 218 without employing the optical system 215 while setting the conductive layer 207 at a predetermined voltage. The recording system can be simplified further in construction using this technique.

Although one row of recordable portions 202a, 202b, 202c . . . are provided in the peripheral direction as shown in FIGS. 20 and 22, they may be arranged in a plurality of rows in the peripheral direction.

Figure 23:
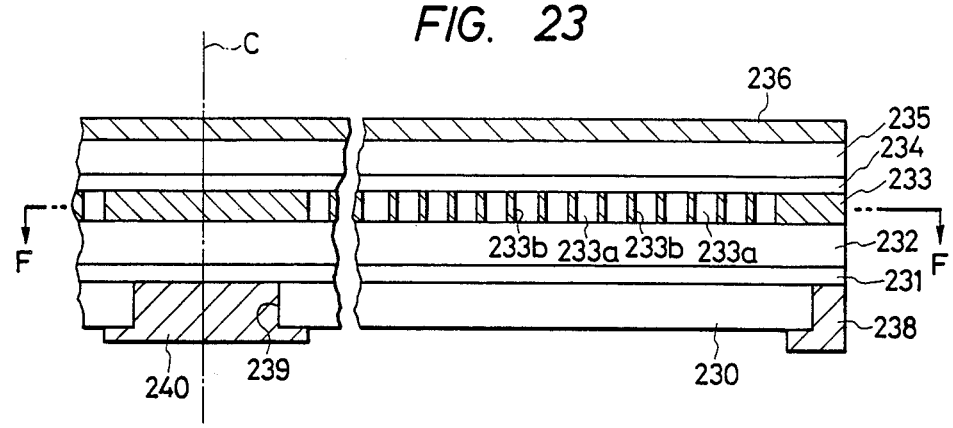
FIG. 23 is a vertical sectional view showing the structure of a recording medium for use in the present invention.
Figure 24:
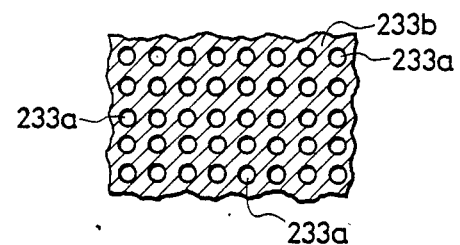
FIG. 24 is a cross-sectional view showing the structure of a charge discharging layer taken along a line F—F in FIG. 23.

FIGS. 23 and 24 are sectional views showing the structure of another recording medium embodying the present invention, wherein there is shown a discoid recording medium as in the case of FIG. 18. Referring to FIG. 23 showing a vertical sectional view taken in the radial direction from the central portion of the recording medium, its structure will be described.

On the surface of a transparent substrate 230 of transparent glass, polycarbonate or the like, there are laminated a transparent conductive layer 231 composed of an $In_{1-x}Sn_x$ oxide film; a photoconductive semiconductor layer 232 composed of a GaAs semiconductor, a III-V group compound of GaAlAs, GaAsP, a II-VI group compound of ZnS, CdS, CdTe; a charge discharging layer 233 composed of n-type monocrystalline silicon; a silicon oxide film ($SiO_2$) layer 234; a nitrided film ($Si_3N_4$) layer 235; and a conductive layer 236 formed by aluminum evaporation.

As shown in FIG. 24, moreover, the charge discharging layer 233 is composed of a number of portions 233a composed of n-type monocrystalline silicon and an isolation region 233b for separating the portions 233a from each other, the isolation region being formed by doping with high-density impurities of with a silicon oxide layer formed through locos oxidation.

In FIG. 23, a conductor 238 is connected to the peripheral edge of the transparent conductive layer 231 and extends via and up to the undersurface of the transparent substrate 230. A through-hole 239 is formed in the central portion of the transparent substrate 230 symmetrically with respect to the center axis C, and a conductor 240 is formed so that it passes through the hole 239 to contact the transparent conductive layer 231 from the undersurface. Since the conductors 238, 240 are used as terminals for applying a redetermined voltage to the transparent conductive layer 231 from the undersurface (as described below), the provision of either one will be sufficient.

The recording medium thus structured in the recording system of FIG. 20 is such that its transparent substrate 230 is arranged opposite to an optical system 210 at the time of recording. Accordingly, a voltage $V_{DD}$ is applied via the conductor 238 or 239 to the transparent conductive layer 231, whereas a voltage $V_{EE}$ is applied to the conductive layer 236. However, the voltage $V_{DD}$ is set lower than the voltage $V_{EE}$ when the recording medium is employed. When photographing is performed in the same manner as described above, a depletion layer is formed in each portion 233a of the monocrystalline silicon of the charge discharging layer 233 in proportion to the intensity of illumination of each portion of the optical image incident through the transparent substrate 230 and the transparent conductive layer 231, and the charges simultaneously produced pass through the oxide film 234 and are accumulated in the nitrided film 235. Consequently, distributions of charges and depletion layers corresponding to latent images are formed and preserved over long periods of time.

Playback can also be performed by causing an optical system 215 to scan the transparent substrate 230 in the playback system of FIG. 22. As the substrate 230 of high strength glass is used as the recording medium in this embodiment, it offers excellent mechanical strength.

As set forth above according to the present invention, the depletion layer is formed in the monocrystalline semiconductor layer in correspondence with the pattern of the optical image by directly irradiating the recording medium with the optical image of an object, and at the same tme the charges are accumulated in the nitrided film to record a latent image, whereby images of good quality can be recorded using a system quite simple in construction.

Figure 25:
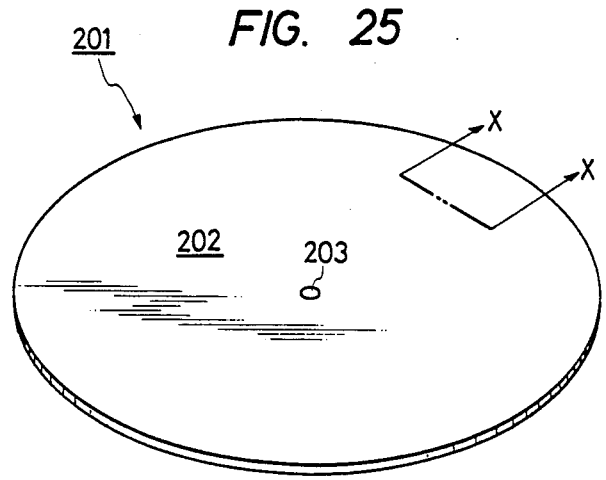
FIG. 25 is an external schematic view showing the structure of a recording medium developed according to the present invention.

Further referring to the accompanying drawings, another embodiment of the present invention will be described. FIG. 25 is an external perspective view of a recording medium constructed in accordance with the invention, wherein a discoid recording medium 201 has a recording area 202 formed by a laminating recording materials (as described below) and is turned around the center hole 203 for recording/playback.

Figure 26:
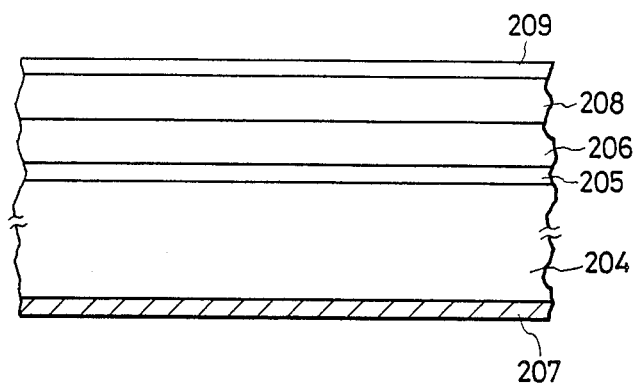
FIG. 26 is a sectional view of a principal part of the recording medium of FIG. 25.

Referring to FIG. 26, the sectional structure (sectional view taken along a line X—X) of the recording area 202 will be described. On a semiconductor substrate 204 composed of an n-type monocrystalline silicon wafer, there are laminated a silicon dioxide film (SiO$_2$) layer 205 and a nitrided film (Si$_3$N$_4$) layer 206, whereas a conductive layer 207 is formed by aluminum evaporation on the undersurface thereof. Further, a photoconductive semiconductor layer 208 composed of e.g., mainly a GaAs semiconductor, a III–V group compound such as GaAlAs and GaAsP, a II–VI group compound such as ZnS, CdS and CdTe or a IV group compound such as amorphous silicon, and a transparent conductive layer 209 such as an In$_{1-x}$Sn$_x$ oxide having translucent and conductive properties are laminated on the surface of the nitrided film 206.

Figure 27:
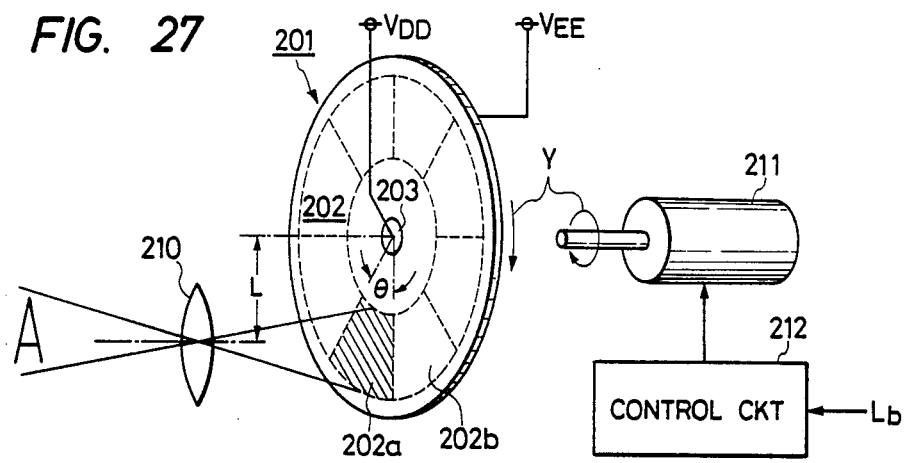
FIG. 27 is a diagram showing the construction of a recording apparatus embodying the present invention.

FIG. 27 is a block schematic diagram showing the construction of a recording apparatus employing the recording medium 201, wherein the recording medium 201 is arranged so that light incident via an optical system 210 focused to form an optical image for an object A on the recording area 202. The recording medium 201 whose center hole 203 is supported by the rotary shaft of as driving gear 211 is turned, stepwise in a peripheral direction Y through steps of predetermined angle $\theta$ of rotation. The optical axis of the optical system 210 is also shifted by a predetermined distance L from the axis of rotation of the center hole 203, whereby data can be recorded on the circular portion (indicated by circular broken lines) of the recording area 202 as the recording medium 201 is turned. Since the recording medium 201 is turned through the angle $\theta$ for each recording operation, a plurality of images free from overlap are formed in the respective recording portions 202a, 202b . . . .

A control circuit 212 causes the driving gear 211 to turn the recording medium through the angle $\theta$ for each image recording operation, e.g., synchronously with a signal L$_b$ generated when the release button of an electronic still camera incorporating the device is depressed for photographing.

When the recording medium 201 is loaded on the driving gear 231, a contact terminal (not shown) contacts the transparent conductive layer 209 to apply a voltage $V_{DD}$, whereas another contact terminal contacts the conductive layer 207 to apply a voltage $V_{EE}$. In other words, the voltage $V_{EE}$-$V_{DD}$ is applied between the transparent conductive layer 209 and the conductive layer 207 so as to set the potential of the transparent conductive layer 209 lower by $-25$ to $-40$ V than that of the conductive layer 207. In this embodiment, the voltage $V_{EE}$ is set at ground potential (0 V) and the voltage $V_{DD}$ within the range of $-25$ to $-49$ V.

If the contact terminal is allowed to directly contact the transparent conductive layer 209 and the conductive layer 207, the contact face will wear out. In order to prevent such frictional wear, an extra-hard conductor may be provided on the surface of the transparent conductive layer 209 in the portion not used for recording from among the recording area 202, e.g., an area close to the center hole 203 to improve the wear resistance of the transpaent conductive layer 209 by letting the contact terminal slide on the conductor. In order to prevent the conductive layer 207 from wearing, a conductive rotary plate (not shown) may otherwise be allowed to contact the recording medium 201 simultaneously when the recording medium 201 is loaded on the support mechanism to apply the voltage $V_{EE}$ thereto via another rotary mechanism.

Figure 28:
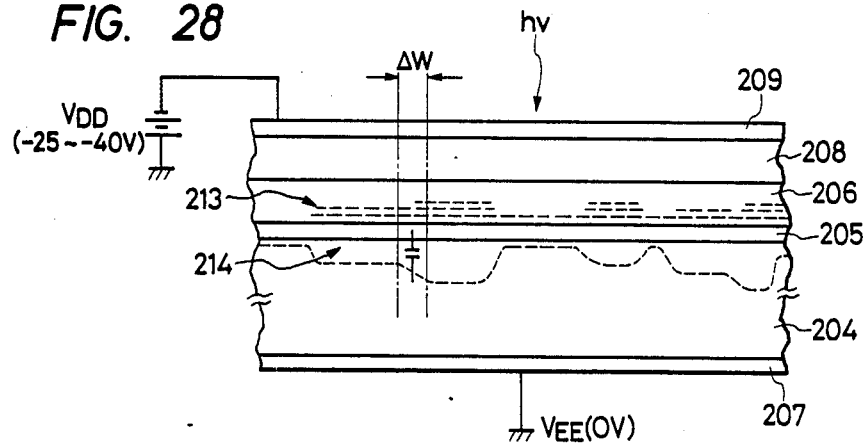
FIG. 28 is a sectional view of a principal part illustrating the principal of image formation according to the present invention.

Referring to FIG. 28, a method for forming an image according to the present invention will subsequently be described, wherein there is shown a sectional view corresponding to FIG. 19. When the light incident via the optical system 210 is focused to form an optical image on the transparent conductive layer 209, the optical image passes through the transparent conductive layer 209 and strikes the high resistant optical semiconductor layer 208. Since the photoconductive semiconductor layer 208 has a resistance which changes in an analog manner proportionally to the intensity of illumination, a charge distribution 213 corresponding to a change of voltage is produced and a depletion layer 214 resulting from the charge distribution is simultaneously formed via the oxide film 205 in the semiconductor substrate 204. That is, the charge distribution and the change of the depletion layer correspond to a latent image. Even when the application of the voltages $V_{DD}$, $V_{EE}$ is stopped by removing the recording medium from the system after the termination of photography, the latent image is not erased but maintained. The charges are accumulated without being erased and accordingly preserved over long periods of time.

Figure 29:
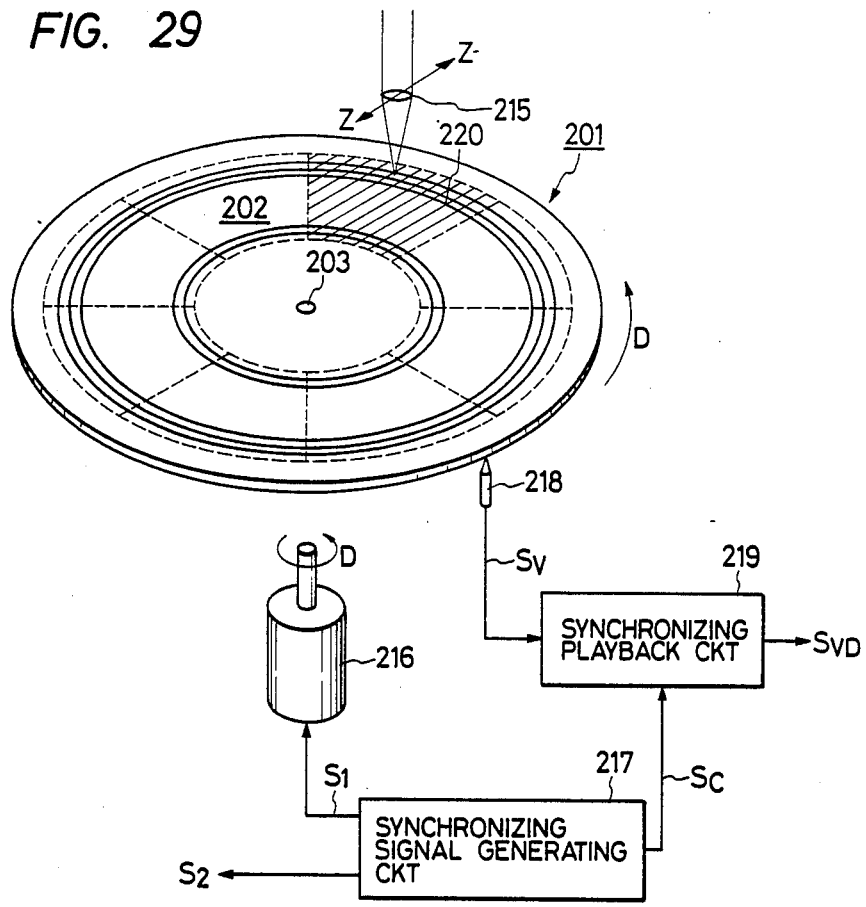
FIG. 29 is a diagram showing the construction of a playback apparatus embodying the present invention.

A method of playing back the image recorded on the recording medium 201 will be described. FIG. 29 is a block schematic diagram of a playback apparatus embodying the present invention, wherein an optical system 215 is used to focus a laser beam of constant intensity direct the finely focused beam onto the recording area 202 of the recording medium 201, and move the beam spot thus irradiated in the radial direction Z—Z of the recording medium 201. The recording medium 201 is turned by a driving gear 216 around the center hole 203 in a predetermined direction D at a constant speed. A synchronizing signal generating circuit 217 generates a synchronizing control signal $S_1$ used for causing the driving gear 216 to turn the recording medium 201 at a constant speed and a synchronizing control signal $S_2$ for causing the light source device 215 to move the beam spot in the radial direction Z—Z at a constant speed or with a constant period. Consequently, the laser beam from the optical system 215 scans the recording area 2 as the recording medium 201 spirally or concentrically scans the area where a latent image has been formed according to the synchronizing control signal $S_2$. In this case, e.g., 525 scanning tracks are provided, which is equivalent to the number of scanning lines in the standard NTSC television system.

A stylus 218 composed of an extra-hard conductive material and used to detect changes of electrostatic capacity. The detecting principle will be described below. A synchronizing playback circuit 219 receives the signal $S_v$ detected by the stylus 218 and forms the image signal $S_{VD}$ that is played back; that is, the synchronizing playback circuit 219 supplied by the synchronizing signal generating circuit 217 with a clock signal $S_c$ synchronous with the synchronizing control signals $S_1$, $S_2$ determines which one of the scanned portions of the latent image is responsible for the detected signal $S_v$ and selectively produces the image signal $S_{VD}$ to be played back. More specifically, the detected signal $S_v$ is a so-called linear sequential signal, and, when the image recorded in the portions 220 (marked with slanted lines in FIG. 29) is played back for instance, a signal obtained by scanning any other recording area is removed from the detected signal $S_V$, and the signal $S_{VD}$ is applied to a television monitor to effect display of the reproduced image by means of horizontal and vertical scanning.

As set forth above, the stylus 218 is brought close to the conductive layer 207 to detect changes of electrostatic capacity and sometimes comes into contact with the turning recording medium 201, thus causing the latter to wear. To prevent such wear the wear resistance of the surface of the conductive layer 207 can be improved or a rotary transformer employed (so as to eliminate all contact) whereby the primary winding of the rotary transformer is connected to the conductive layer 207 and the detected signal $S_v$ generated on the secondary winding as the result of magnetic coupling is supplied to the synchronizing playback circuit 219.

The principle of detecting the change of electrostatic capacity corresponding to the latent image resulting from this scanning will be described. When the constant intensity laser beam is directed via the optical system 215 onto the recording area 202, the electrostatic capacity of the depletion layer 214 formed under the very small portion ΔW thus irradiated can be detected in the form of a change of dielectric voltage (see FIG. 28) which voltage change is equivalent to the detected signal $S_v$. Accordingly, it is preferred for the purpose of improving the playback resolution that the laser beam diameter be made small. Moreover, since the charges accumulated in the nitrided film 206 are maintained without being discharged even though the signal is played back, the recording medium can be played back many times.

To erase the latent image from the recording medium, such as prior to the recording of a new image, a relatively high voltage opposite in polarity to that referred to in FIG. 27 is applied between the conductive layer and the transparent conductive layer 209 to cause a discharge of the charges accumulated in the nitrided film 206.

As set forth above in the aforesaid embodiment, the recording medium quite simple in structure can be provided because the mutual recording/playback effect attained by the nitrided film 6, the oxide film 5 and the semiconductor substrate 4 is utilized, and moreover data can be recorded on the recording area without physically contacting the recording medium utilizing the property of the photo-conductive semiconductor that its resistance varies according to the quantity of light applied. As a result, there is no wear of the recording medium.

Because the optical image is directly recorded as a latent image, the signal processing circuit and the like incorporated in an electronic camera equipped can be simplified to a great extent, and such a camera can also be as easily operated as in the case of a camera employing a conventional silver salt film. Moreover, the latent image can readily be erased by simply applying a predetermined voltage to the transparent conductive layer. Although a description has been given of a discoid recording medium in this embodiment, the recording medium may take the shape of a card or the like.

As set forth above, the light is focused to form an optical image on the surface of the recording medium composed of at least the laminate on the surface of the semiconductor substrate, the laminate comprising the oxide film and the nitrided film, and of the conductive layer on the undersurface thereof, the predetermined voltage being applied to the conductive layer whereby the charges excited by the light of the optical image in the semiconductor substrate are accumulated between the nitrided film and the oxide film, whereas the depletion layer corresponding to the charges is simultaneously formed in the semiconductor substrate. As the aforesaid phenomenon is utilized to form a latent image, there can be provided a recording medium of quite simple structure but which is capable of performing very accurate recording and playback. The recording medium is extremely easy to use and, when incorporated in an electronic camera or high-density optical memory disk, it has the excellent effect of simplifying their construction.

A description will further be given of a method of forming an image employing a conventional recording medium with the present invention.

Figure 30:
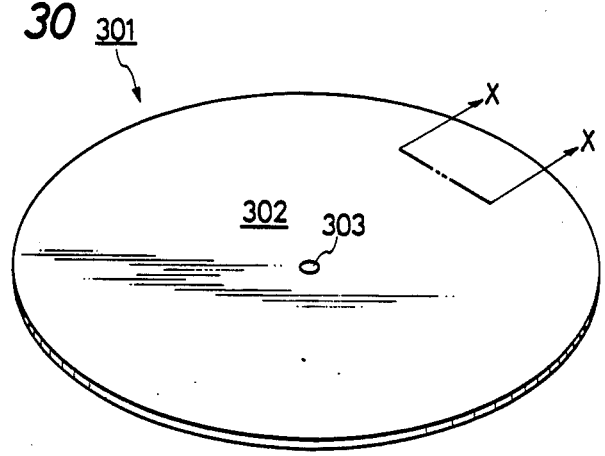
FIG. 30 is an external schematic view of a conventional recording medium.

FIG. 30 is an external perspective view of a conventional recording medium, wherein a recording area 302 composed of a laminated recording material (as described below) is formed the surface of a discoid recording medium 301, which is turned around the center hole 303 for recording and playback.

Figure 31:
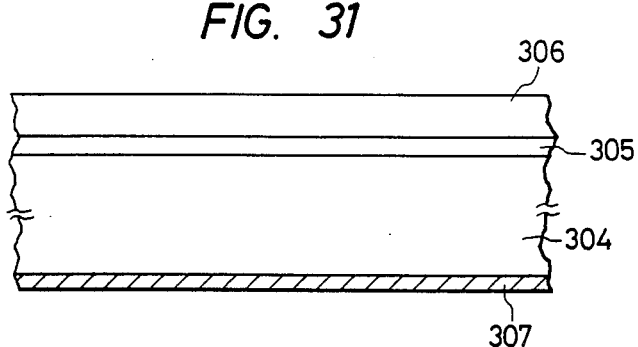
FIG. 31 is a sectional view of a principal part of the recording medium of FIG. 30.

FIG. 31 is a sectional structural view (taken along a line X—X) of the principal pat of the recording area 302. As shown in FIG. 31, a silicon dioxide film ($SiO_2$) layer 305 and a nitrided film ($Si_3N$) layer 306 are laminated on the surface of a semiconductor substrate 304 on n-type monocrystalline silicon, whereas a conductive layer 307 is formed by aluminum evaporation on the undersurface thereof.

Figure 32:
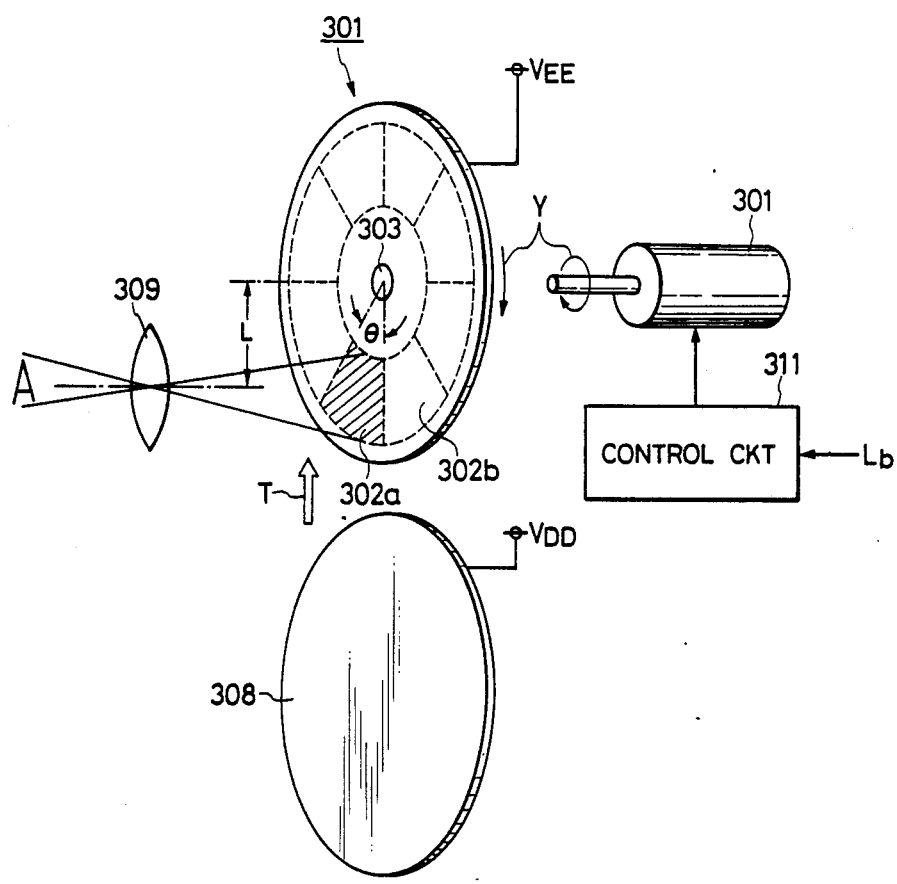
FIG. 32 is a diagram showing the construction of a recording apparatus embodying the present invention.

FIG. 32 is a block schematic diagram of a recording apparatus employing the recording medium 301 with a charged plate 308, which comes in contact with the hole surface of the nitrided film 306 when the recording medium 301 is loaded on a support mechanism (not shown). More specifically, the charged plate 308 is supplied with a predetermined voltage $V_{DD}$, and, when the recording medium 301 is loaded, the charged plate 308 is caused to move in the direction of arrow T to apply the voltage $V_{DD}$ to the entire surface of the nitrided film 306. That is, the charged plate 308 turns together with the recording medium 301 during photographing (as described below) to direct an optical image of an object via the charged plate 308 onto the recording area 302. The charged plate 308 is composed of a material such as an $In_{1-x}Sn_x$ having translucent and conductive properties.

The recording medium 301 is arranged so that a light incident via an optical system 309 is focused to form an optical image of an object A on the recording area 302. The recording medium 301 thus loaded is turned by a driving gear 310 around its center hole 303 in a predetermined direction Y through a predetermined angle $\theta$ of rotation for each recording operation. The optical axis of the optical system 309 is also shifted by a predetermined distance L from the axis of rotation of the center hole 303, whereby data can be recorded on the circular portion (indicated by circular broken lines) of the recording area 302 as the recording medium 301 is turned. Since the recording medium 301 is turned through the angle $\theta$ for each recording operation, a plurality of images free from overlap are formed in the respective recording portions 301a, 302b.... A control circuit 311 performs the aforesaid control operation synchronously with a signal $L_b$ generated when the release button of an electronic still camera incorporating this device is depressed for photographing.

When the recording medium 301 is loaded on the support mechanism, a contact terminal (not shown) contacts the transparent conductive layer 307 to apply the voltage $V_{DD}$. In this embodiment, the voltage $V_{EE}$ is set at ground potential (0 V) and the changes in the nitrided film 306 are negatively polarized.

If the contact terminal is allowed to directly contact the conductive layer 307, the contact face may wear. In order to prevent such frictional wear, the surface of the conductive layer 307 may be covered with an extra-hard conductor on which the contact terminal slides, or a conductive rotary plate may otherwise be allowed to contact the recording medium 301 simultaneously when the recording medium 301 is loaded on the support mechanism to apply the voltage $V_{EE}$ thereto via another rotary mechanism.

Figure 33:
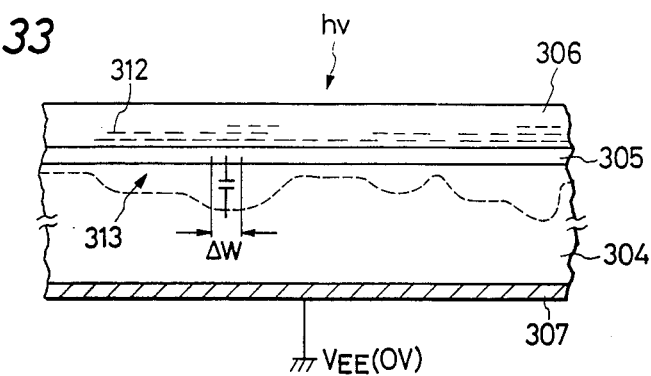
FIG. 33 is a sectional view illustrating the principle of image formation according to the present invention.

Referring to FIG. 33, a method of forming an image according to the present invention will subsequently be described, wherein there is shown a sectional structural view corresponding to FIG. 31. when the light incident via the optical system 309 is focused to form an optical image on the charged plate 308, charge equivalent to the focused image pattern are generated and discharging or charging occurs the energized charges in the nitrided film 306, whereby a distribution of charges equivalent to the focused image pattern shown therein is ultimately formed in the nitrided film 306. A depletion layer 303 resulting for the distribution of charges is simultaneously formed in the semiconductor substrate 304; that is, the distributions of charges and depletion layer 312, 313 change in analog fashion corresponding to the focused image pattern and are equivalent to a latent image. Since the charges are not discharged because of the charge accumulating action of the nitrided film 306, even when the recording medium 301 is removed form the apparatus after the termination of photographing, the charge are held over long periods of time.

Figure 34:
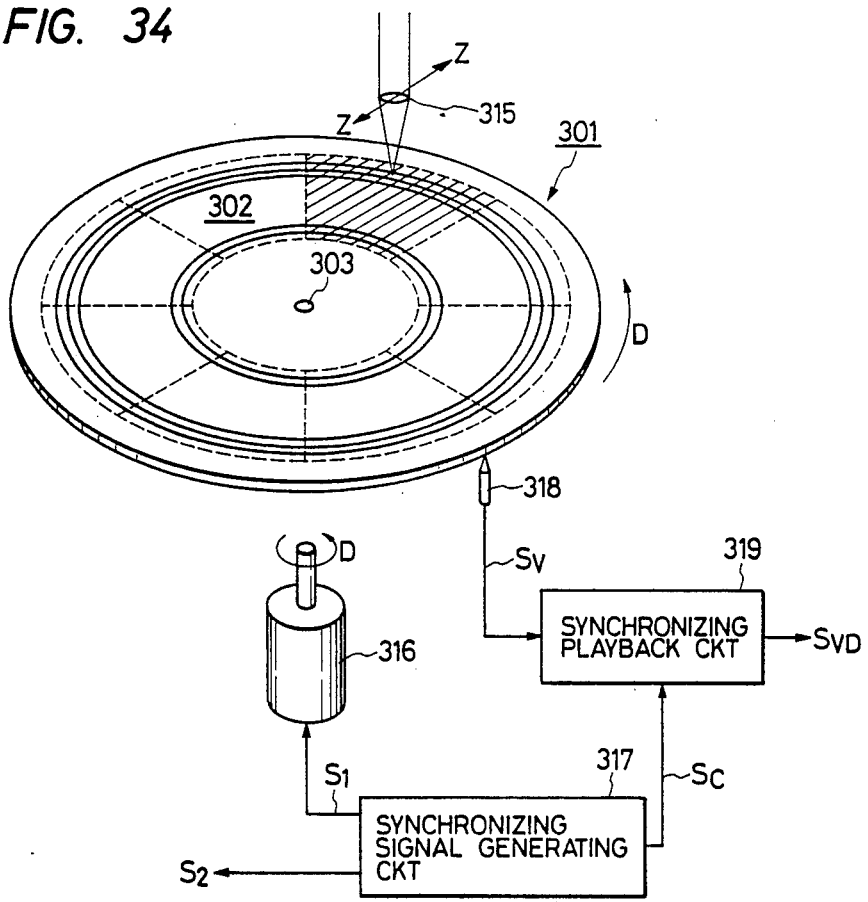
FIG. 34 is a diagram showing the construction of a playback embodying the present invention.

A method of reproducing an image from the recording medium 301 will be described. FIG. 34 is a schematic structural view of a playback apparatus, wherein an optical system 315 is used to finely focus a laser beam of fixed intensity, direct the beam onto the recording area 302 of the recording medium 301, and move the irradiated point in the radial direction Z—Z of the recording medium 301. The recording medium 301 loaded thereon is turned by a driving gear 316 around the center hole 303 in a predetermined direction D at a constant speed.

The recording medium 301 is turned by a driving gear 316 around the center hole 313 in a predetermined direction D at a constant speed. A synchronizing signal generating circuit 317 generates a synchronizing control signal $S_1$ used for causing the driving gear 316 to turn the recording medium 301 at constant speed and a synchronizing control signal $S_2$ for causing the light source device 315 to move the irradiated point in the radial direction Z—Z at a constant speed or with a constant period. Consequently, the laser beam from the optical system 315 scans the recording area 302 as the recording medium 301 turns, i.e., it spirally or concentrically scans the area where a latent image has been formed according to the synchronizing control signal $S_2$. In this case, e.g., 525 tracks are provided which are equivalent in number to the number of scanning linear employed in the standard NTSC television system.

A stylus 318 is composed of an extra-hard conductive material and is used to detect changes of electrostatic capacity generated by the above scanning. (The detecting principle will be described below.) A synchronizing playback circuit 319 receives the signal $S_V$ detected by the stylus 318 and forms the image signal $S_{VD}$. That is, the synchronizing playback circuit 319, supplied by the synchronizing signal generating circuit 317 with a clock signal $S_c$ synchronous with the synchronizing control signals $S_1$, $S_2$, determines which one of the scanned portions of the latent image is responsible for the detected signal $S_y$ and selectively produces the image signal $S_{VD}$ to be played back. More specifically, the detected signal $S_y$ is a so-called linear sequential signal, and, when the image recorded in the portion 320 marked with slanted lines in FIG. 34 is played back, for instance, a signal obtained by scanning any other recording area is removed form the detected signal $S_y$ and the signal $S_{VD}$ is applied to a television monitor to effect the display of an image by means of horizontal and vertical scanning.

As set forth above, the stylus 318 is brought close to the conductive layer 307 to detect changes of electrostatic capacity and sometimes comes into contact with the turning recording medium 301, thus causing the latter to be worn. In order to prevent such wear, the wear resistance of the surface of the conductive layer 307 can be improved a rotary transformer employed by connecting the primary winding of the rotary transformer to the conductive layer 307 and supplying the detected signal $S_y$ generated on the secondary winding thereof as the result of magnetic coupling to the synchronizing playback circuit 319.

The principle of detecting changes of electrostatic capacity corresponding to the latent image resulting from the scanning will be described. When the constant-intensity laser beam emerging from the optical system 315 strikes the recording area 302, the electrostatic capacity of the depletion layer 313 (see FIG. 33) can be detected in the form of a change of voltage, which voltage change is equivalent to the detected signal $S_y$. Accordingly, it is preferred for the purpose of improving the playback resolution for the diameter of the laser beam to be made quite small. Moreover, since the charges accumulated in the nitrided film 306 are maintained without being discharged even after the signal has been played back, the recording medium can be played back any number of times.

To erase the recording medium, as described with reference to FIG. 32, erasing is carried out by applying the predetermined voltage $V_{DD}$ to the nitrided film 306 to discharge the charges accumulated in the nitrided film 306. This process can be automatically executed using the charged plate 308 of the apparatus shown in FIG. 32 prior to photographing; otherwise a separate erasing apparatus may be used to effect the process. Corona discharge may also be used.

According to this embodiment, as set forth above, a recording medium extremely simple in construction can be obtained utilizing the mutual effect of recording/playback by means of the nitrided film 306, and the oxide film 305 and the semiconductor substrate 304, whereas data is recorded on the recording medium without physical contact with the medium.

Figure 35A:
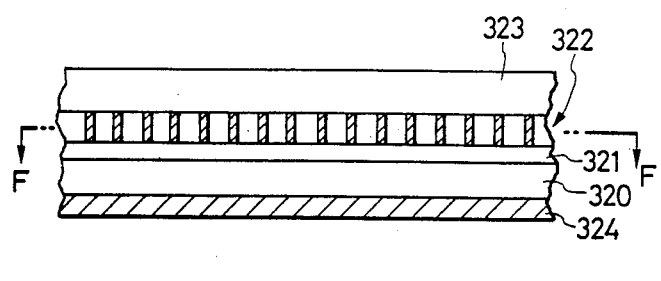
FIG. 35(a) is a vertical sectional view showing a principal part of the structure of a recording medium applied to another embodiment of the present invention.
Figure 35B:
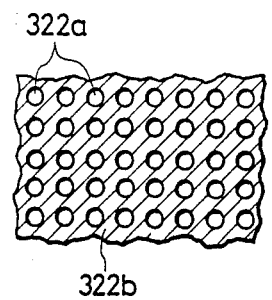
FIG. 35(b) is a sectional view taken along a line F—F in FIG. 35(a)
Figure 36:
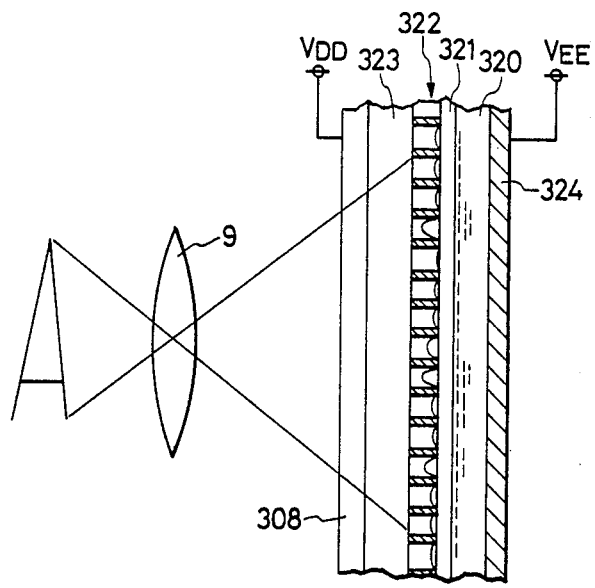
FIG. 36 is a diagram illustrating the principle of a recording method employed by a recording medium applied to still another embodiment of the present invention.

Referring to FIGS. 35(a), 35(b) and 36 another embodiment of the present invention will be described. FIG. 35(a) is vertical sectional view of a recording medium applicable to this embodiment, whereas FIG. 35(b) is a sectional view taken along a line F—F in FIG. 35(a). As shown in FIG. 35(a) a silicon dioxide film ($SiO_2$) layer 321, a semiconductor layer 322 of n-type monocrystalline silicon, polysilicon or amorphous silicon and a photoconductive semiconductor layer 323 mainly composed of a GaAs semiconductor, 1 III-V group compound of GaAlAs, GaAsP or a IV group semiconductor of amorphous silicon are laminate in the surface of a nitrided film ($Si_3N_4$) layer 320, whereas a conductive layer 324 formed by aluminum evaporation is laid on the underside of the nitrided film 320.

As shown in FIG. 35(b), moreover, the semiconductor layer 322 is formed of a number of portions 322a composed of n-type monocrystalline silicon and an isolation region 322b (portion marked with slanted lines) for separating the portions 322a from each other, the isolation region being formed by doping high-density impurities or with a silicon oxide layer formed through locos oxidation. The shape and arrangement of the portions 322a are determined depending on their use and design specifications.

FIG. 36 is a schematic diagram of the recording apparatus of FIG. 32 and using the recording medium shown in FIG. 35 in place of the recording medium 301. Referring to FIG. 36 the principle of a method of forming an image will be described. The transparent conductive charged plate 308 is caused, when the recording medium is loaded, to contact the surface of the photoconductive semiconductor layer 323, and an optical image of an object A is directed via a photographic lens 309 thereon. As the voltage $V_{DD}$ (ground potential) and the voltage $V_{EE}$ (a predetermined potential between 25 and 40 V are respectively applied to the charged plate 308 and the conductive layer 324, the voltage $V_{DD}-V_{EE}$ is applied between the photoconductive semiconductor layer 323 and the nitrided film 320. When the optical image is applied in this state, a distribution of resistance changes corresponding to the intensity of illumination of each portion of the optical image is generated in the photoconductive semiconductor layer 323, whereas a voltage corresponding to the resistance distribution is applied to each portion 322a of the semiconductor layer 322. Consequently, a depletion layer whose depth corresponds to the voltage distribution (equivalent to the resistance distribution) is formed in each portion 322a, and the charges generated in correspondence with each depletion layer pass through the oxide film 321 due to the tunnelling effect, and are accumulated in the nitrided film 320. Since the charge distribution in the depletion layer and the nitrided film 320 is maintained even though the application of the voltages $V_{EE}$, $V_{DD}$ is stopped by removing the recording medium from the apparatus, the charges can be preserved over long periods of time.

Although the distributions of the charges and depletion layers are not become completely continuous because the portions 322a are separated from each other by the isolation regions 322b. because the density of the portion 322a is high, it is possible to obtain an extremely high resolution.

Referring to FIG. 34, a method of reproducing a signal using the above recording medium will be described. The photoconductive semiconductor layer 323 shown in FIG. 35(a) is arranged opposite the light source device 315 of the playback apparatus shown in FIG. 34 and linearly scanned using the spot light source emerging from the optical system 315. In this case, a stylus 318 capable of contacting the conductive layer 324 is used to detect the capacity of the depletion layer to effect playback.

Since the optical image is directly recorded as a latent image in the embodiments described above, the signal processing circuit can be simplified by compared with an electronic camera employing a conventional solid-state pickup element and magnetic recording device, so that such as camera is as easy to operate as a camera employing conventional silver salt film. Moreover, the recording medium may be made in the shape of a card or the like.

According to the present invention as set forth above, the recording medium has at least the laminate composed of the oxide film and the nitrided film formed on the surface of the semiconductor substrate and the conductive layer formed on the undersurface thereof, the nitrided film of the recording medium being supplied with charges to cause the optical image of an object to be directed onto the semiconductor substrate. Further, the depletion layer corresponding to the optical image is formed in the semiconductor substrate and charges are accumulated in the nitrided film in order to record a latent image. Accordingly, there is provided a recording medium of quite simple structure but capable of precise recording and playback. When incorporated in a electronic camera, the invention has the excellent effect of simplifying the overall camera construction since the recording medium is easy to handle.

What is claimed is:

1. A semiconductor recording medium comprising at least a laminate comprising, arranged in the order stated, a transparent conductive layer having translucent conducting properties, a photoconductive semiconductor layer whose resistance value changes in proportion to a quantity of light received thereon, a plurality of semiconductor layers mutually electrically separated from each other, an oxide film, and a nitrided film.

2. The semiconductor recording medium as claimed in claim 1, wherein a transparent board is attached to one side of said transparent conductive layer, so that an input recording signal is incident on said transparent conductive layer via said transparent board.

3. A method for recording signals on a semiconductor recording medium comprising, arranged in the order stated, at least a laminate comprising a transparent conductive layer having translucent conducting properties, a photoconductive semiconductor layer whose resistance value changes in proportion to a quantity of light received thereon, a plurality of semiconductor layers mutually electrically separated from each other, an oxide film, and a nitrided film, said method comprising the steps of: applying an optical signal modulated according to an input recording signal on said transparent conductive layer while applying a predetermined voltage between said transparent conductive layer and said nitrided film of said recording medium so as to cause a depletion layer and charges to be produced and held in said semiconductor layers and said nitrided film, respectively, for recording purposes.

4. The method of recording signals on a semiconductor recording medium as claimed in claim 3, further comprising the steps of rotating said semiconductor recording medium so that a surface of said transparent conductive layer is scanned using said optical signal.

5. A method for recording signals on a semiconductor recording medium comprising, arranged in the order stated at least a laminate comprising a transparent conductive layer having translucent conducting properties, a photoconductive semiconductor layer whose resistance value changes in proportion to a quantity of light received thereon, a plurality of semiconductor layers mutually electrically separated from each other, an oxide film, and a nitrided film, said method comprising the steps of: directing an optical signal of a photographic object on said transparent conductive layer while applying a predetermined voltage between said transparent conductive layer and said nitrided film of said recording medium so as to cause a depletion layer and charges to be produced and held in said semiconductor layer and said nitrided film, respectively, for recording purposes.

6. A method for reproducing recorded signals from a semiconductor recording medium comprising at least a laminate comprising, arranged in the order stated a transparent conductive layer having translucent conducting properties, a photoconductive semiconductor layer whose resistance value changes in proportion to a quantity of light received thereon, a plurality of semiconductor layers mutually electrically separated from each other, an oxide film, and a nitrided film, said method comprising the steps of: detecting an electrostatic capacity between said transparent conductive layer and said nitrided film while directing light with a fixed intensity of illumination onto said transparent conductive layer so as to reproduce the recorded signal.

7. The method for reproducing recorded signals from a semiconductor recording medium as claimed in claim 6, further comprising the step of rotating said semiconductor recording medium so that a surface of said transparent conductive layer is scanned while light with said fixed intensity of illumination is directed thereon.

8. A recording medium comprising: a semiconductor substrate, a laminate laid on one surface of said semiconductor substrate, said laminate comprising, arranged in the order stated from said one surface, an oxide film, a nitrided film, a photoconductive semiconductor layer and a transparent conductive layer, and a conductive layer formed on the other surface of said semiconductor substrate.

9. A method for recording signals on a semiconductor recording medium comprising a laminate laid on one surface of a semiconductor substrate, said laminate comprising, arranged in the order stated from said one surface, an oxide film, a nitrided film, a photoconductive semiconductor layer and a transparent conductive layer, and a conductive layer formed on the other surface of said semiconductor substrate, said method comprising the steps of: directing an optical signal modulated according to an input recording signal on said transparent conductive layer while applying a predetermined voltage between said transparent conductive layer and said nitrided film of said recording medium so as to cause a depletion layer and charges to be produced and held in predetermined portions of said semiconductor substrate and said nitrided film, respectively, for recording purposes.

10. The method for recording signals on a recording medium as claimed in claim 9, further comprising the step of rotating said recording medium so that the surface of said transparent conductive layer is scanned using said optical signal.

11. A method for recording signals on a semiconductor recording medium comprising a laminate laid on one surface of a semiconductor substrate, said laminate comprising, arranged in the order stated from said one surface, an oxide film, a nitrided film, a photoconductive semiconductor layer and a transparent conductive layer, and a conductive layer formed on the other surface of said semiconductor substrate, said method comprising the steps of: directing an image of a photographic object on said transparent conductive layer while applying a predetermined voltage between said transparent conductive layer and said conductive layer so as to cause a depletion layer and charges to be produced and held in said semiconductor substrate and said nitrided film, respectively, for recording purposes.

12. A method for recording signals on a semiconductor recording medium comprising a laminate laid on a surface of a semiconductor substrate, said laminate comprising, arranged in the order stated from said one surface, an oxide film, a nitrided film, a photoconductive semiconductor layer and a transparent conductive layer, and a conductive layer formed on the other surface of said semiconductor substrate, said method comprising applying an input recording signal between said transparent conductive layer and said conductive layer while applying light with a fixed intensity of illumination on said transparent conductive layer so as to cause a depletion layer and charges to be produced and held in said semiconductor substrate and said nitrided film, respectively, for recording purposes.

13. The method for recording signals on a recording medium as claimed in claim 12, further comprising the step of rotating said recording medium so that a surface of said transparent conductive layer is scanned in response to means for applying said input recording signal.

14. A method for reproducing recorded signals from a recording medium comprising a laminate laid on one surface of a semiconductor substrate, said laminate comprising, arranged in the order stated from said one surface, an oxide film, a nitrided film, a photoconductive semiconductor and a transparent conductive layer, and a conductive layer formed on the other surface of said semiconductor substrate, said method comprising the steps of: detecting an electrostatic capacity between said transparent conductive layer and said conductive layer while directing light with a fixed intensity of illumination of said transparent conductive layer so as to reproduce the recorded signal.

15. The method for reproducing recorded signals from a recording medium as claimed in claim 14, further comprising the steps of turning said recording medium so that a surface of said transparent conductive layer is scanned while light with said fixed intensity of illumination is directed thereon.

16. An electronic still camera system employing a semiconductor recording medium comprising at least a laminate comprising, arranged in the order stated, a monocrystalline semiconductor layer, an oxide film and a nitrided film, and a photoconductive semiconductor layer covering at least one of an undersurface of said monocrystalline semiconductor layer and a surface of said nitrided film, said camera system comprising: at least a recording mechanism comprising means for applying a predetermined voltage between said photoconductive semiconductor layer and said monocrystalline semiconductor layer, and an optical system for directing an image of a photographic object onto said photoconductive semiconductor layer.

17. The electronic still camera system as claimed in claim 16, wherein, for reproducing recorded signals for said semiconductor recording medium, said camera system comprises: a playback mechanism comprising means for linearly scanning said photoconductive semiconductor layer while applying a point light beam thereto with a fixed intensity of illumination, detecting means for detecting changes of electrostatic capacity resulting for said scanning, and playback means for forming an image signal according to a signal detected by said detecting means.

18. A method for forming images by recording latent images using a semiconductor recording medium comprising a laminate laid on one surface of a semiconductor substrate, said laminate comprising, arranged in the order stated, an oxide film, a nitrided film, a photoconductive semiconductor layer and a transparent conductive layer, and a conductive layer formed on the other surface of said semiconductor substrate, said method comprising: directing an optical image of a photographic object from said transparent conductive layer while applying a predetermined voltage between said transparent conductive layer and said conductive layer so as to allow said nitrided film to accumulate charges produced in said semiconductor substrate in correspondence with said optical image, and simultaneously allowing said semiconductor substrate to store a depletion layer.

19. The method for forming images as claimed in claim 18, further comprising erasing latent image by erasing said charges and said depletion layer by applying a voltage opposite in polarity to said predetermined voltage between said transparent conductive layer and said conductive layer.

20. A method for forming images comprising: directing an optical image of a photographic object on a semiconductor substrate of a recording medium comprising a laminate laid on one surface of a semiconductor substrate, said laminate comprising, in the order stated from said one surface, an oxide film, a nitrided film, a photoconductive semiconductor and a transparent conductive layer, and a conductive layer formed on the other surface of said semiconductor substrate, energizing said nitrided film with predetermined charges, and allowing said nitrided film to accumulate charges in a pattern corresponding to said optical image for recording a latent image.

21. The method for forming image as claimed in claim 20, further comprising the step of directing an optical image of said photographic object via a charged plate having a predetermined potential by causing said charged plate to contact said nitrided film having translucent and conducting properties.

* * * * *